(12) United States Patent
Matsushima

(10) Patent No.: US 7,042,593 B2
(45) Date of Patent: May 9, 2006

(54) METHOD OF AND DEVICE FOR IMAGE PROCESSING, AND IMAGE FORMING DEVICE

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 886 days.

(21) Appl. No.: 09/985,367

(22) Filed: Nov. 2, 2001

(65) Prior Publication Data

US 2002/0054397 A1    May 9, 2002

(30) Foreign Application Priority Data

Nov. 6, 2000    (JP) ............... 2000-337611
Mar. 30, 2001    (JP) ............... 2001-100583

(51) Int. Cl.
G06F 15/00    (2006.01)
G06F 15/16    (2006.01)
H04N 1/46    (2006.01)

(52) U.S. Cl. ............ 358/1.9; 358/524; 358/1.15; 709/217

(58) Field of Classification Search .......... 358/1.9, 358/1.14, 1.15, 403, 400, 524; 709/217, 709/236; 345/329, 335, 333; 399/75, 91, 399/38, 76
See application file for complete search history.

(56) References Cited

U.S. PATENT DOCUMENTS

| | | | |
|---|---|---|---|
| 5,361,134 A | | 11/1994 | Hu et al. |
| 5,764,866 A | | 6/1998 | Maniwa |
| 6,020,971 A | * | 2/2000 | Kato et al. ............ 358/1.14 |
| 6,246,487 B1 | | 6/2001 | Kobayashi et al. |
| 6,381,029 B1 | * | 4/2002 | Tipirneni ............ 358/1.14 |
| 6,460,087 B1 | * | 10/2002 | Saito et al. ............ 709/236 |
| 6,480,887 B1 | * | 11/2002 | Hayama ............ 709/217 |
| 2001/0017708 A1 | | 8/2001 | Kobayashi et al. |

FOREIGN PATENT DOCUMENTS

| | | |
|---|---|---|
| DE | 198 14 522 | 11/1998 |
| EP | 1 030 509 | 8/2000 |

OTHER PUBLICATIONS

E. Steinfeld, Tech Search, XP-002076444, pp. 1-4, "Leveraging Browsers as Universal Guis" Dec. 16, 1996.
U.S. Appl. No. 09/985,367, filed Nov. 2, 2001, Matsushima.
U.S. Appl. No. 10/650,715, filed Aug. 29, 2003, Matsushima.
U.S. Appl. No. 10/665,745, filed Sep. 22, 2003, Matsushima.
U.S. Appl. No. 10/938,563, filed Sep. 13, 2004, Matsushima.

* cited by examiner (Continued)

Primary Examiner—Kimberly Williams
Assistant Examiner—Charlotte M. Baker
(74) Attorney, Agent, or Firm—Oblon, Spivak, McClelland, Maier & Neustadt, P.C.

(57) ABSTRACT

When the image processing device is a digital multifunction device, at which are provided a facsimile device application, a printer application, and the like in addition to a copier application, or when there are problems with the network environment, image data and bibliography information, which are stored in a mass storage device, are selectively transferred to an external device in accordance with the respective applications and the network environment.

23 Claims, 16 Drawing Sheets

FIG.5

```xml
<?xml version="1.0" encoding="Shift_JIS"?>
<document>
  <documentName>About XML</documentName>
  <creationDate>19991212T2345Z</creationDate>
  <expirationDate>19991212T2345Z</expirationDate>
  <pageCount>3</pageCount>
  <fileID>10</fileID>
  <apprication>copy</apprication>
  <contentType>image/tiff</contentType>
  <machineVender>XXXXCo,Ltd.</machineVender>
  <machineName>MF-XXX</machineName>
  <machineVersion>1.0</machineVersion>
  <hostAddress>XXX.XXX.XXX.XXX</hostAddress>
  <thumbnailURL>http://XXX.XXX.XXX.XXX/10/thumbnail.jpg</thumbnailURL>
  <copyVolume>10</copyVolume>
  <combine>1</combine>
  <face>simplex</face>
  <pageList>

<fileName>page1</fileName>
      <contentLength>12345</contentLength>
      <width>4800</width>
      <length>6400</length>
      <xResolution>600</xResolution>
      <xResolution>600</xResolution>
      <depth>8</depth>
      <rotation>0</rotation>
      <pageURL>http://XXX.XXX.XXX.XXX/10/1</pageURL>

<fileName>page2</fileName>
      <contentLength>77777</contentLength>
      <width>4800</width>
      <length>6400</length>
      <xResolution>600</xResolution>
      <xResolution>600</xResolution>
      <depth>8</depth>
      <rotation>0</rotation>
      <pageURL>http://XXX.XXX.XXX.XXX/10/2</pageURL>

<fileName>page3</fileName>
      <contentLength>11111</contentLength>
      <width>4800</width>
      <length>6400</length>
      <xResolution>600</xResolution>
      <xResolution>600</xResolution>
      <depth>8</depth>
      <rotation>0</rotation>
      <pageURL>http://XXX.XXX.XXX.XXX/10/3</pageURL>

</pagelist>
</document>
```

FIG.6

| ELEMENT NAME | DESCRIPTION |
|---|---|
| document | IMAGE DATA DOCUMENT |
| documentName | CHARACTER NAME |
| creationDate | DATE OF CREATION |
| expirationDate | STORAGE PERIOD |
| pageCount | NUMBER OF PAGES |
| fileID | IMAGE DATA FILE ID UNIQUE TO THE MACHINE |
| application | APPLICATION USED IN ACCUMULATING |
| contentType | FORMAT OF IMAGE DATA |
| machineVender | NAME OF MANUFACTURER OF ACCUMULATING MACHINE |
| machineName | NAME OF MODEL OF ACCUMULATING MACHINE |
| machineVersion | SERIAL NUMBER OF ACCUMULATING MACHINE |
| hostAddress | IP ADDRESS OF ACCUMULATING MACHINE |
| thumbnailURL | URL OF THUMBNAIL |
| copyVolume | NUMBER OF SETS |
| combine | AGREEMENT |
| face | BOTH SIDES/ONE SIDE |
| pageList | LIST OF PAGES |
| page | PAGE |
| fileName | NAME OF FILE ON FTP SERVER ALLOTTED TO EACH PAGE AT TIME OF TRANSFER BY FTP |
| contentLength | SIZE OF IMAGE DATA OF EACH PAGE |
| width | PIXEL WIDTH |
| length | LINE LENGTH |
| rResolution | MAIN SCANNING DIRECTION RESOLUTION |
| yResolution | SUBSCANNING DIRECTION RESOLUTION |
| depth | NUMBER OF BITS PER PIXEL |
| rotation | ANGLE OF ROTATION |
| pageURL | URL OF PAGE IMAGE DATA |

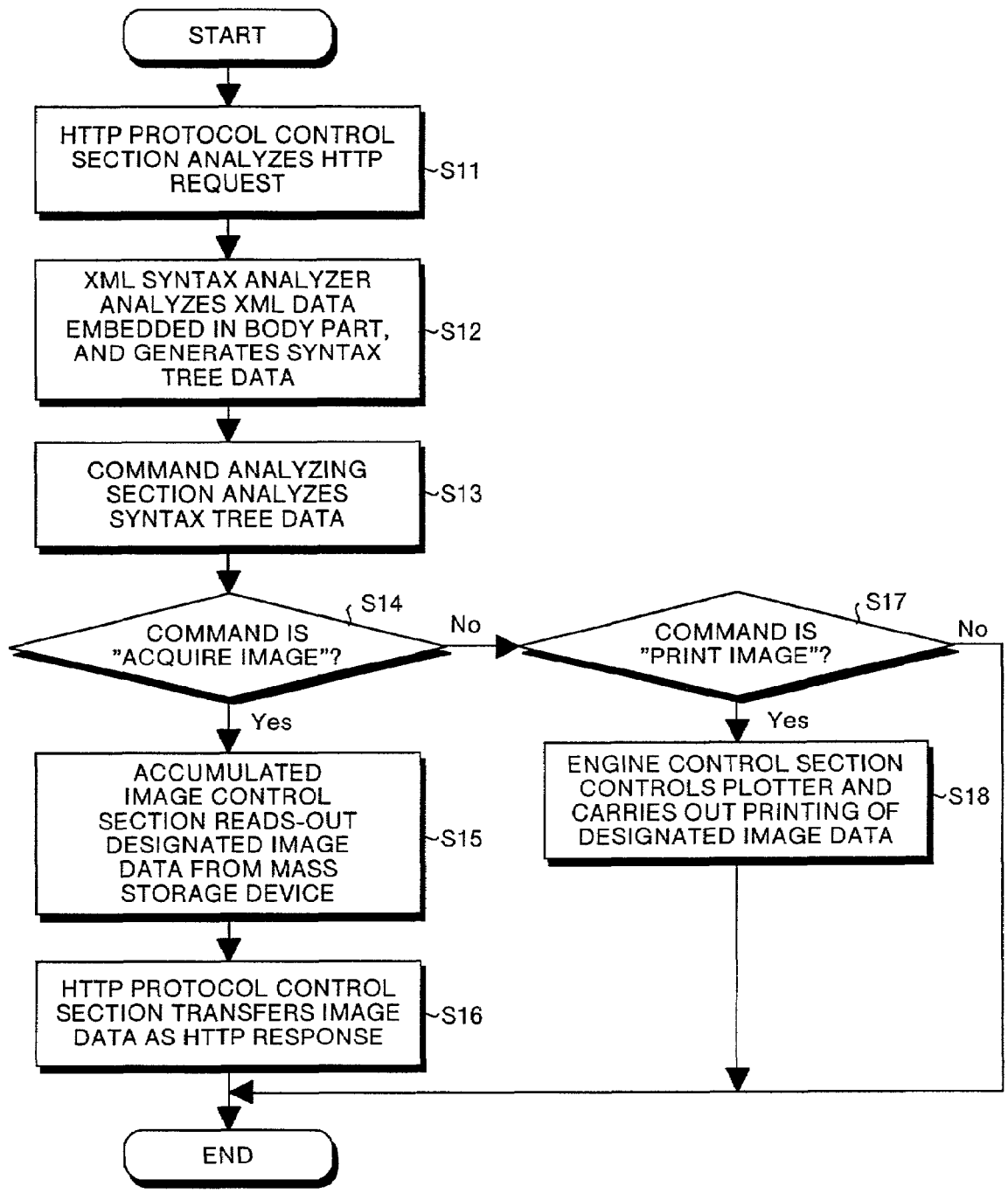

FIG.8

```
<?xml version="1.0"?>
<operation>
  <getpage>
    <fileID>10</fileID>
    1
  </getpage>
</operation>
```

FIG.9

```
<?xml version="1.0"?>
<operation>
  <print>
    <fileID>10</fileID>
    <fileID>20</fileID>
    <copyVolume>2</copyVolume>
    <staple>top</staple>
  </print>
</operation>
```

METHOD OF AND DEVICE FOR IMAGE PROCESSING, AND IMAGE FORMING DEVICE

FIELD OF THE INVENTION

The present invention relates to an image processing device which has a mass storage device capable of storing a large number of image data, and which accumulates in the mass storage device image data which is generated in accordance with execution of an application relating to image data processing, and which transfers the image data accumulated in the mass storage device to an external device connected to a network, and relates to an image processing method, an image forming device, and a program for executing the method on a computer. Particularly, this invention relates to a method of and a device for image processing, an image forming device, and a program for executing the method on a computer which can form a system corresponding to respective applications and a network environment, and whose ease of usage is improved.

BACKGROUND OF THE INVENTION

Conventionally, as image processing technologies have improved and various types of devices have been made more compact and the like, digital multifunction devices, which have in a single machine a copier function, a fax function, a printer function, a scanner function, and the like, have been developed and have arrived on the market. Such digital multifunction devices are usually network connected in various types of network environments such as a LAN (Local Area Network), and can be commonly used by plural computers.

Further, in recent years, digital copiers have been developed in which a mass storage hard disk is provided in the main body, and which are equipped with a copy server function by which image data which has been copied or printed is accumulated in the hard disk and can be printed again at a predetermined time.

Moreover, digital multifunction devices have been developed which provide a document management function by which, without the users being conscious thereof, transmits and accumulates, in a server computer which is connected to a network, all of the image data which is copied or printed, and thereafter, images which have been printed in the past can be referred to or searched for via the server computer and can be reprinted.

However, in digital multifunction devices provided with a copy server function, a problem arises in that the image data accumulated in the hard disk can only be used for reprinting, and cannot be used for other applications.

Moreover, a digital multifunction device which provides a document management function, a wide-range network environment is needed in order to transmit all of the images. Further, from the assumption that all of the image data is accumulated, in order to convert image data into a small capacity format and accumulate the data, a problem arises in that the quality of the images deteriorates at the time or reprinting.

SUMMARY OF THE INVENTION

It is an object of this invention to provide a method of and a device for image processing which form a system which corresponds to various applications and network environments, and whose ease of usage is improved. It is another object of this invention to provide a computer program that contains instructions which when executed on a computer realizes the method according to the present invention on the computer.

The image processing device according to one aspect of this invention comprises: a mass storage device which can store a large number of image data, wherein the image processing device accumulates, in the mass storage device, image data generated in accordance with execution of an application relating to image data processing, and transfers image data accumulated in the mass storage device to an external device connected to a network; a bibliography information storing unit which stores, in the mass storage device and in correspondence with respective image data, bibliography information relating to the respective image data; and a transfer contents selecting unit which selects, from among the image data and the bibliography information stored in the mass storage device, transfer contents to be transferred to the external device.

According to the invention of the above-mentioned aspect, bibliography information relating to respective image data are stored in a mass storage device in correspondence with the respective image data, and transfer contents which are to be transferred to an external device are selected from among the image data and the bibliography information stored in the mass storage device. Thus, for example, in a case in which the image processing device is a digital multifunction device or the like, which is provided with a facsimile application and a printer application and the like in addition to a copier application, or in a case in which there are problems with the network environment, the image data and the bibliography information stored in the mass storage device can be selectively transferred to the external device in accordance with the various applications and the network environment. Thus, because it is possible to construct a system corresponding to various applications and a network environment, the ease of usage can be improved.

The image processing method according to another aspect of this invention comprises: an accumulating step of accumulating, in a mass storage device which can store a large number of image data, image data which are generated in accordance with execution of an application relating to image data processing; a transferring step of transferring, to an external device connected to a network, image data accumulated in the mass storage device; a bibliography information storing step of storing, in the mass storage device and in correspondence with respective image data, bibliography information relating to the respective image data; and a transfer contents selecting step of selecting, from among the image data and the bibliography information stored in the mass storage device, transfer contents to be transferred to the external device.

According to the invention of the above-mentioned aspect, bibliography information relating to respective image data are stored in a mass storage device in correspondence with the respective image data, and transfer contents which are to be transferred to an external device are selected from among the image data and the bibliography information stored in the mass storage device. Thus, for example, in a case in which the image processing device is a digital multifunction device or the like, which is provided with a facsimile application and a printer application and the like in addition to a copier application, or in a case in which there are problems with the network environment, the image data and the bibliography information stored in the mass storage device can be selectively transferred to the external device in accordance with the various applications and the network environment. Thus, because it is possible to construct a system corresponding to various applications and a network environment, the ease of usage can be improved.

The image forming device according to still another aspect of this invention comprises: hardware resources used in image forming processing such as a display section, a printing section, a storage section, and an image pick-up section; a plurality of applications, which carry out image forming processings specific to the respective user services of printing, coping, facsimile; and a platform which is provided between the applications and the hardware resources, wherein when the user services are provided, the platform commonly carries out management of the hardware resources and control of execution which are carried out at the plurality of applications, the platform including a memory control module which stores, in the storage section and in correspondence with respective image data, bibliography information relating to the respective image data; and a data transfer module which transfers, to an external device, transfer contents formed from the image data and/or bibliography information stored in the storage section.

According to the invention of the above-mentioned aspect, a memory control module, which stores, in a storage section, bibliography information relating to respective image data in correspondence with the respective image data, and a data transfer module, which transfers, to an external device, transfer contents which are formed from the image data and/or the bibliography information stored in the storage portion, are provided on a platform. Thus, image data and bibliography information can be transferred to the external device commonly for the respective applications.

The image forming device according to still another aspect of this invention comprises: hardware resources used in image forming processing such as a display section, a printing section, a storage section, and an image pick-up section; a plurality of applications, which carry out image forming processings specific to the respective user services of printing, coping, facsimile; and a platform which is provided between the applications and the hardware resources, wherein when the user services are provided, the platform commonly carries out management of the hardware resources and control of execution which are carried out at the plurality of applications, the platform including a network control service which controls network communication with an external device; and an HTTP analyzing module which analyzes contents of HTTP command data inputted from the external device via a network.

According to the invention of the above-mentioned aspect, a network control service, which controls network communication with the external device, and an HTTP analyzing module, which analyzes the contents of HTTP command data inputted from the external device via the network, are provided at a platform. Thus, the HTTP server can be used in common for the respective applications.

Other objects and features of this invention will become apparent from the following description with reference to the accompanying drawings.

BRIEF DESCRIPTION OF THE DRAWINGS

FIG. 5 is an explanatory diagram which shows an example of generated XML data.

FIG. 6 is an explanatory diagram which shows the meaning of XML tags.

FIG. 7 is a flowchart which shows a flow of image data transfer processing.

FIG. 8 is an explanatory diagram which shows an example of XML data of an image acquire command.

FIG. 9 is an explanatory diagram which shows an example of XML data of an image print command.

DESCRIPTION OF THE PREFERRED EMBODIMENTS

Embodiments of the method of and the device for image processing, the image forming device, and the computer program for executing the method on a computer relating to the present invention will be described in detail with reference to the accompanying drawings.

The first embodiment illustrates a case in which the present invention is applied to a conventional digital multifunction device having a copier function, a fax function, a printer function, and a scanner function. The second embodiment illustrates a case in which the present invention is applied to a digital multifunction device in which common processings included in the respective functions are integrated.

Figure 1:
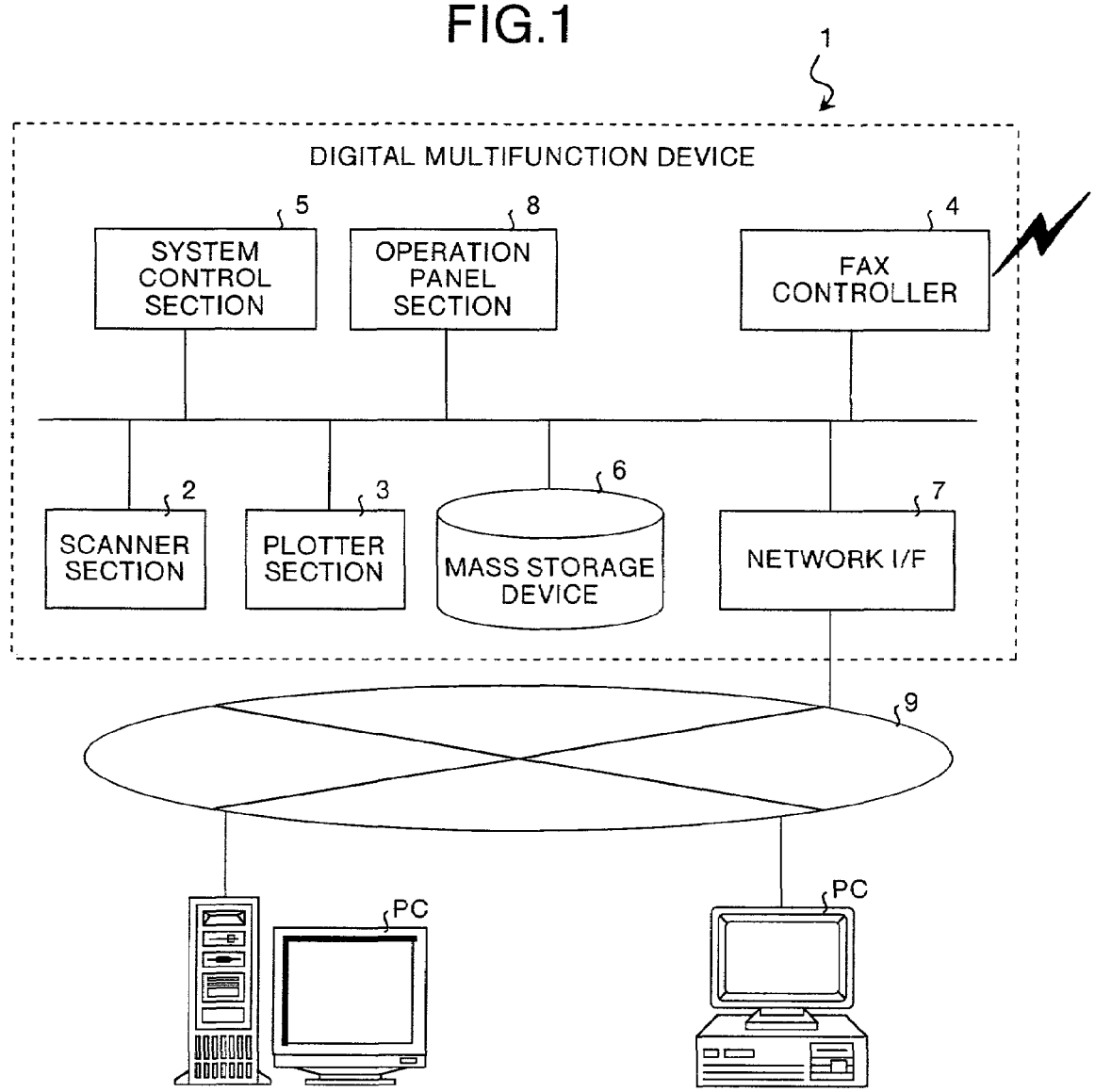
FIG. 1 is a block diagram which schematically shows the structure of a digital multifunction device of an embodiment of the present invention.

FIG. 1 is a block diagram which schematically shows the structure of a digital multifunction device 1. As shown in FIG. 1, the digital multifunction device 1 has a scanner section 2 which reads images; a plotter section 3 which prints images; a fax controller 4 which controls transmission and receipt of faxes; a system control section 5 which controls the respective sections of the digital multifunction device 1; a mass storage device 6 which functions as an image data storage which accumulates image data and bibliography information of the image data; a network interface (network I/F) 7 for connection to a network 9 such as a LAN or the like; and an operation panel section 8.

The scanner section 2 reads the image of an original, and outputs, to the plotter section 3 and the mass storage device 6, image data corresponding to the read original image.

The plotter section 3 prints, onto recording paper, images corresponding to image data outputted from the scanner section 2 and image data received via the fax controller 4 and the network I/F 7. In addition to an electrophotographic method, various printing methods such as an ink jet method, a sublimation type heat transfer method, a silver salt photographic method, a direct heat-sensitive recording method, a fusion type heat transfer method, and the like can be applied to the plotter section 3. Because concrete structures thereof are known, detailed description thereof will be omitted.

The fax controller 4 decompresses compressed image data which has been received via a public line and transfers the decompressed image data to the system control section 5, as well as compresses image data transferred from the system control section 5 and transmits the compressed image data via a public line.

The mass storage device 6 is formed by, for example, a hard disk drive (HDD), and stores image data transferred from the system control section 5 and bibliography information of the image data. Further, on the basis of a keyword such as an ID or the like transferred via the system control section 5, the mass storage memory device 6 searches the stored image data and bibliography information of the image data, reads out the searched-for image data and bibliography information of the image data, and transfers it to the system control section 5.

The network I/F 7 carries out communication with a personal computer (PC) or the like which is an external device connected to the network 9, and receives requests to peruse or requests to print image data stored in the mass storage memory device 6. Further, the network I/F 7 corresponds to the protocols of FTP (File Transfer Protocol) and HTTP (Hypertext Transport Protocol), and exhibits an FTP client function and an HTTP server function by control of the system control section 5.

The operation panel section 8 is an operation section for receiving instructions from a user, and is formed by, for example, a touch panel type liquid crystal panel. By using the operation panel 8, display of the state of the digital multifunction device 1, input of respective types of information, selection of image data or a printer, setting of printing conditions, and the like are carried out.

Figure 2:
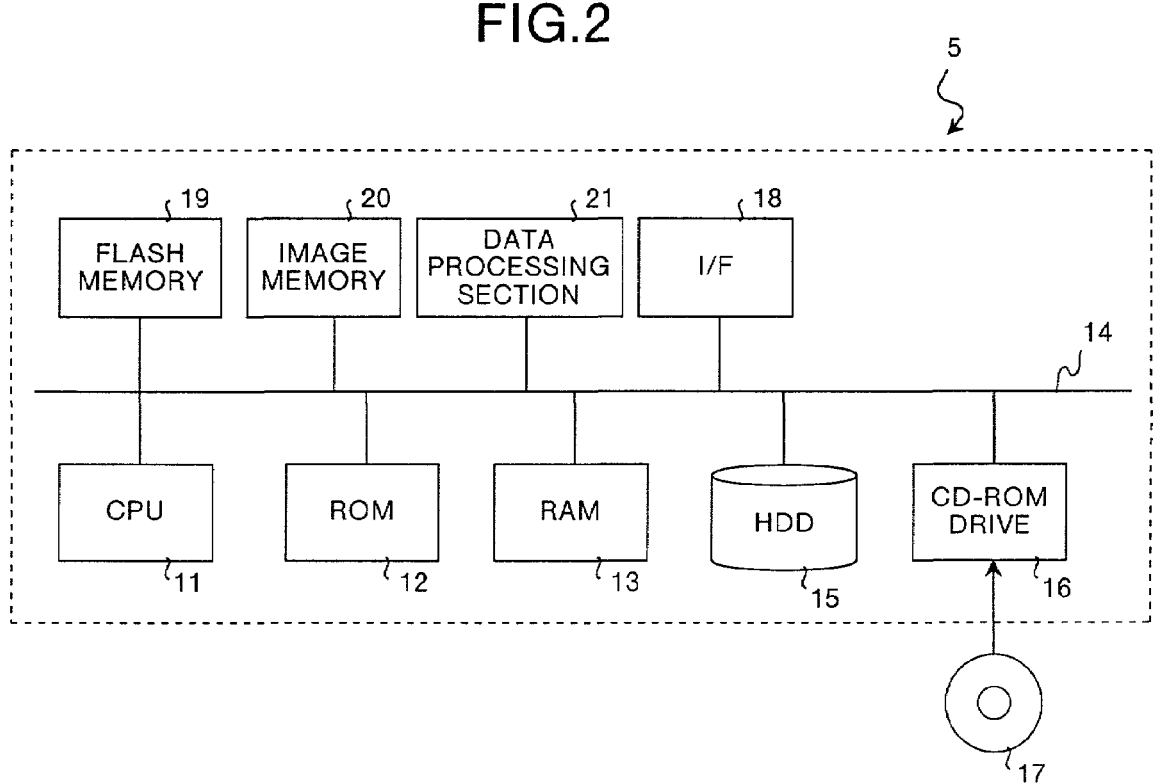
FIG. 2 is a block diagram which shows electrical connections of a system control section.

Next, the hardware structure of the system control section 5 shown in FIG. 1 will be described. FIG. 2 is a diagram showing the hardware structure of the system control section 5 shown in FIG. 1. As shown in FIG. 2, the system control section 5 is equipped with a CPU (Central Processing Unit) which concentratedly controls the respective sections. A ROM (Read Only Memory) 12, which is memory which is exclusively used for reading and in which BIOS and the like are stored, and a RAM (Random Access Memory) 13, which rewritably stores various types of data and which functions as the work area of the CPU 11, are connected to the CPU 11 via a bus 14. Further, an HDD 15 in which a control program is stored, a CD (Compact Disk)-ROM drive 16 which reads a CD-ROM 17, an interface (I/F) 18 which governs communications with the scanner section 2 and the plotter section 3 and the like, a flash memory 19 which is a non-volatile memory, an image memory 20, and a data processing section 21 are connected to the bus 14.

The flash memory 19 is a non-volatile memory which stores various types of setting information and a data management file (index file) needed for providing the database function of the digital multifunction device 1. The image memory 20 is a storage section which temporarily accumulates image data transferred from the scanner section 2 and the like via the I/F 18.

Setting information, which relates to transfer of the image data and the bibliography information of the image data stored in the mass storage device 6, is an example of setting information which is stored in the flash memory 19. Specifically, "do not transfer" which is a setting for not transferring the image data and the bibliography information, "transfer only bibliography" which is a setting for transferring only the bibliography information, and "transfer both bibliography and image" which is a setting for transferring both the image data and the bibliography information, are stored in the flash memory 19 as setting information.

The data processing section 21 is a section which carries out image processings, such as rotation processing, magnification changing processing, resolution converting processing, and the like, on the image data which is temporarily accumulated in the image memory 20, and is a section which prepares a reduced image accompanying a conversion of resolution. The data processing section 21 carries out image processings on the basis of information set at the operation panel section 8, and transfers the processed image data, via the I/F 18, to the plotter section 3, the fax controller 4, and the network I/F 7.

A predetermined control program is stored in the CD-ROM 17 shown in FIG. 2. The CPU 11 reads, at the CD-ROM drive 16, the control program stored on the CD-ROM 17, and installs the program in the HDD 15. In this way, the system control section 5 is set in a state in which various processings which will be described later can be carried out.

Note that, in place of the CD-ROM 17, media of various methods such as various types of optical disks such as DVDs, various types of photomagnetic disks, various types of magnetic disks such as floppy disks, and the like, may be used. Further, a program may be downloaded from the network 9 such as the internet or the like, via the network I/F 7, and may be installed into the HDD 15. The program may operate on a predetermined OS (Operating System). In this case, the OS may take over the execution of a portion of the various types of processings which will be described later. The program may be included as a portion of a program file of a group which forms predetermined application software, such as word processing software, or the OS or the like.

Figure 3:
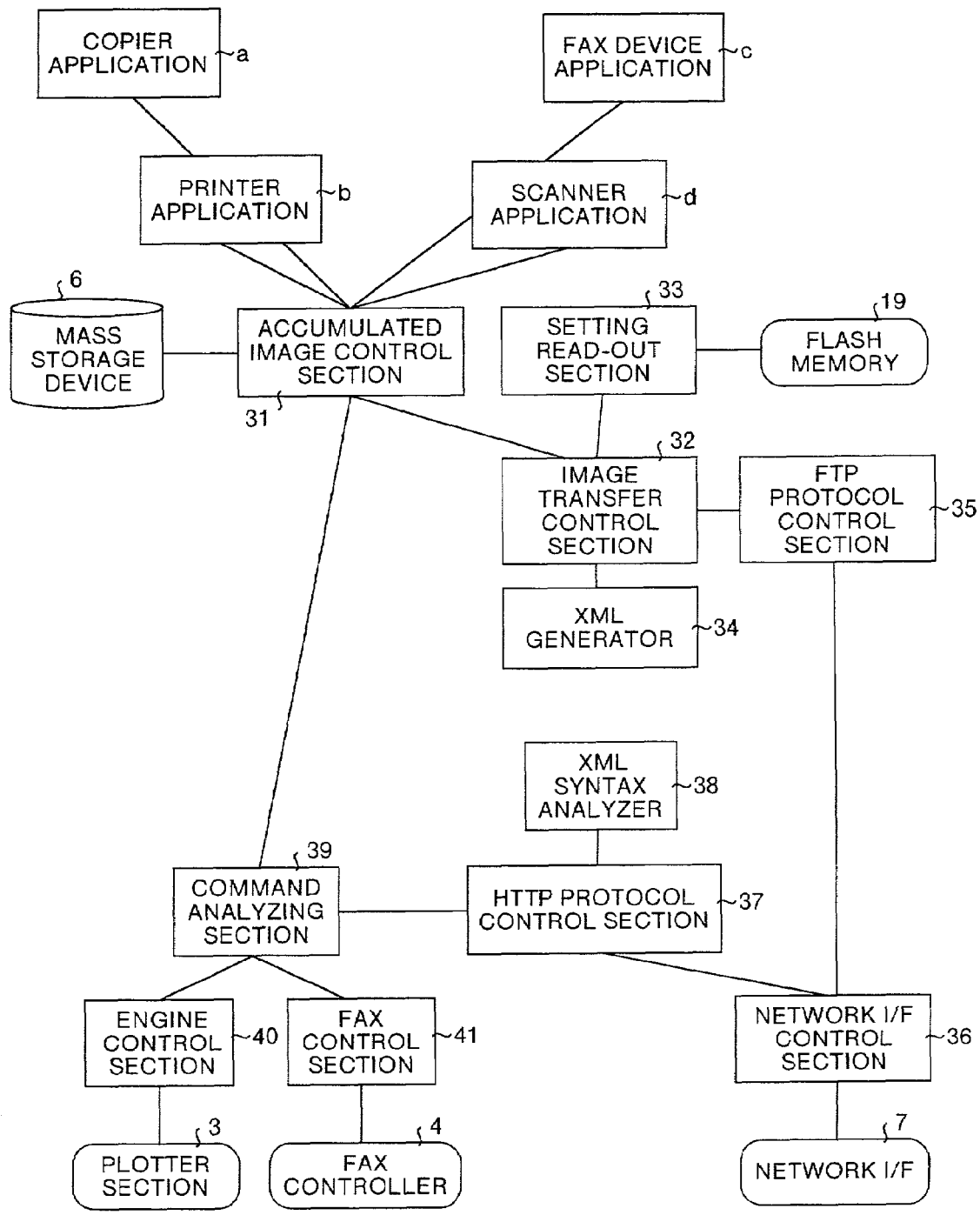
FIG. 3 is a function block diagram which shows main portions of the digital multifunction device.

Next, the contents of the various types of processings, which the CPU 11 provided at the system control section 5 of the digital multifunction device 1 executes on the basis of the control program, will be described. FIG. 3 is a function block diagram showing main portions of the digital multifunction device 1, and FIG. 4 is a flowchart showing the flow of processing at the time when images are accumulated by each application.

As shown in FIG. 3, on the basis of the control program, the system control section 5 exhibits the respective functions of an accumulated image control section 31, an image processing control section 32, a setting reading section 33, an XML generator 34, an FTP protocol control section 35, a network I/F control section 36, an HTTP protocol control section 37, an XML syntax analyzer 38, a command analyzing section 39, an engine control section 40, a fax control section 41, and the like.

Figure 4:
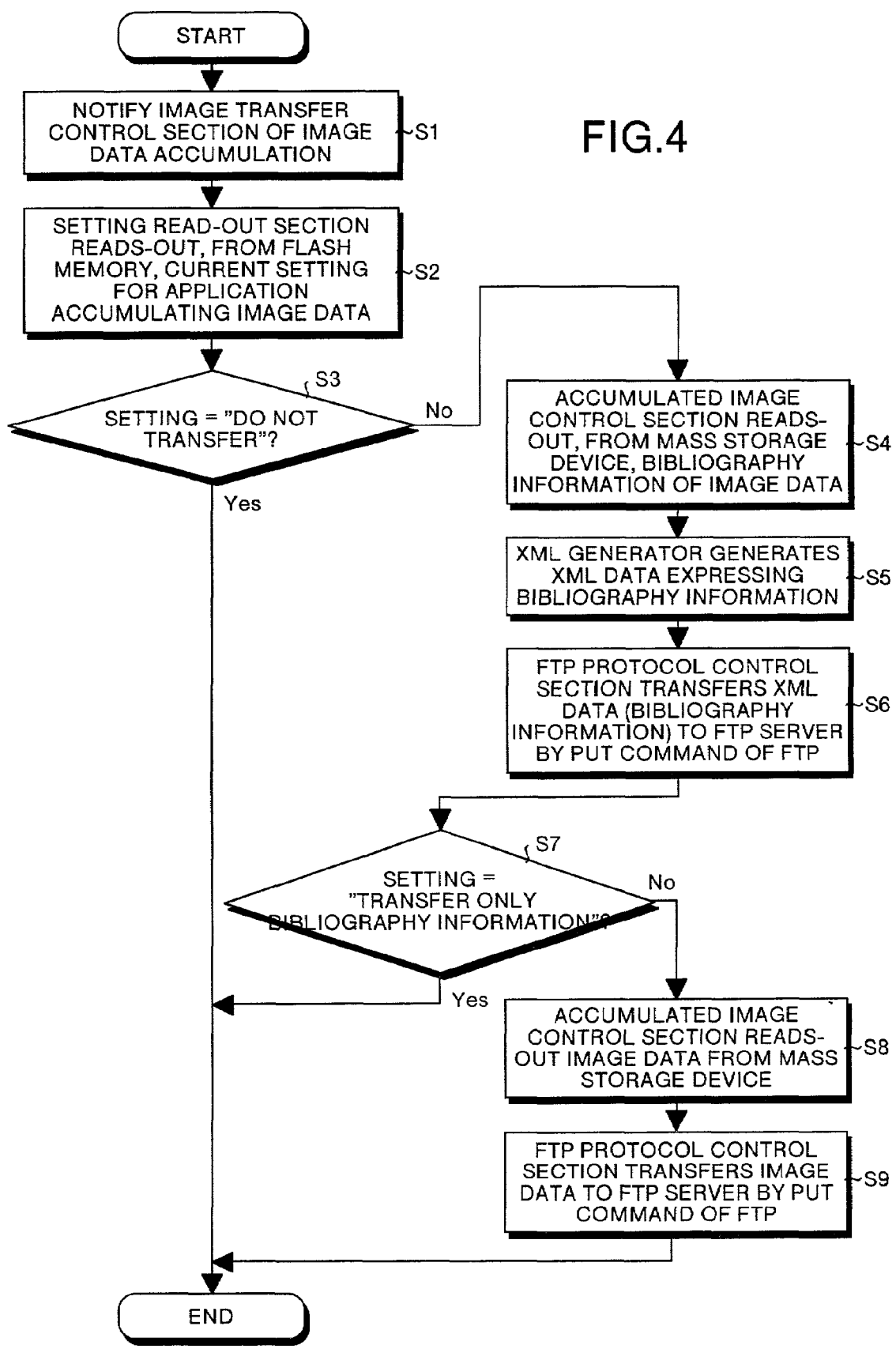
FIG. 4 is a flowchart showing a flow of processings at a time when images are accumulated by various applications.

As shown in FIG. 4, when image data accumulation is requested of the accumulated image control section 31 from respective applications a through such as copier, a printer, and the like, the accumulated image control section 31 accumulates image data as well as bibliography information in the mass storage device 6, and simultaneously, informs the image processing control section 32 that image data has been accumulated (step S1). At this time, the function of the bibliography information storing unit is executed.

The image processing control section 32 reads out, from the flash memory 19 and via the setting reading section 33, the current setting information for the application which accumulates the image data (step S2).

Then, in a case in which the setting information stored in the flash memory 19 is "do not transfer" (Y in step S3), processing ends as is. In a case in which the setting information stored in the flash memory 19 is not "do not transfer" (N in step S3), the bibliography information of the image data is read out from the mass storage device 6 (step S4), and XML data expressing the read-out bibliography information of the image data is generated by the XML By; generator 34 (step S5).

FIG. 5 is an explanatory diagram which shows an example of generated XML data. FIG. 6 is an explanatory diagram showing the meanings of the XML tags. The XML data shown in FIG. 5 expresses the bibliography information of the image data accumulated in the copier application. From this bibliography information, it is read that the image data was accumulated on Dec. 12, 1999, the number of pages of image data was three pages, and 10 sets of copies were made at the time of accumulation. Further, by referring to the "thumbnailURL", the thumbnail image of the image data can be acquired. By referring to the "pageURI", the image data of the page data can be acquired.

The XML data (bibliography information of the image data) generated by the XML generator 34 is transferred, by the FTP protocol control section 35, to a personal computer PC which functions as an FTP server (step S6). Note that, in this case, a PUT command of FTP is used. In a case in which the setting information stored in the flash memory 19 is "transfer only bibliography" (Y in step S7), the processing ends.

On the other hand, in a case in which the setting information stored in the flash memory 19 is "transfer both bibliography and image" (N in step S7), the image data is read out from the mass storage device 6 by the accumulated image control section 31 (step S8), and the read-out image data is transferred to the FTP server by the FTP protocol control section 35 (step S9). Accordingly, in steps S2 to S9, the function of the transfer contents selecting unit is executed.

The image data and the bibliography information stored in the mass storage device 6 can be selectively transferred to the personal computer PC which is an external device connected to the network 9, in accordance with the network environment and the various applications which exhibit the copier function, the fax function, the printer function, the scanner function, and the like of the digital multifunction device 1. Thus, a system which corresponds to various applications and the network environment can be structured, and the ease of usage can be improved.

For example, in a case in which the application attaches importance to image quality at the time of reprinting, it is possible to not transfer the image data and to only transfer the bibliography information. In a case in which the application exhibits an image perusal function at the personal computer PC, a setting can be made such that both the image data and the bibliography information are transferred.

Next, in a case in which the setting information stored in the flash memory 19 is "transfer only bibliography", as occasion demands, there maybe the need to transfer the image data. Thus, the image data transfer processing in such a case will be explained. FIG. 7 is a flowchart showing the flow of image data transfer processing.

When an HTTP request to the digital multifunction device 1 is generated via the network 9, the network I/F control section 36 receives this, and the received HTTP request is analyzed at the HTTP protocol control section 37 (step S11).

Next, syntax analysis of the XML data embedded in the body part is carried out by the XML syntax analyzer 38 which exhibits an XML analyzing function, and syntax tree data expressing the XML data is generated (step S12). Thereafter, the syntax tree data is analyzed by the command analyzing section 39, and the command is extracted (step S13).

In a case in which the extracted command is "acquire image" (Y in step S14), the designated image data is read out from the mass storage device 6 by the accumulated image control section 31 (step S15). The read-out image data is transmitted onto the network 9 as an HTTP response by the HTTP protocol control section 37 (step S16). FIG. 8 is an explanatory diagram showing an example of the XML data of an image acquire command. The XML data embedded in the body part shown in FIG. 8 expresses that page 1 of the image data of "ID10" is to be acquired.

On the other hand, in a case in which the extracted command is "print image" (N in step S14 and Y in step S17), printing of the designated image data is carried out by controlling the plotter section 3 by the engine control section 40 (step S18). FIG. 9 is an explanatory diagram showing an example of XML data of an image print command. The XML data embedded in the bodypart shown in FIG. 9 expresses that two sets of the two image data which are "ID10" and "ID20" are to be printed, and that the top portions are to be stapled. Although not illustrated, operations such as fax transmission of designated image data, erasing of accumulated image data, and the like can also be realized.

The bibliography information is transferred simultaneously with the accumulating of image data in the mass storage device 6. By transferring the image data in a case in which there is a transfer request from the personal computer PC which is an external device, in an environment having low network performance, it is possible to transfer the image data only in cases in which there is a transfer request from the personal computer PC which is an external device. Thus, the load on the network can be reduced.

Further, in an environment having low network performance, the load on the network can be reduced by transferring image data during the nighttime which is a time period when users are few, or by transferring image data in a case in which it is judged that network traffic is light by a network observing function which observes network traffic.

Note that, in the present embodiment, a case is described in which data is transferred by using FTP. However, the present invention is not limited to the same, and data transfer using electronic mail or the like may be used.

In the above-described first embodiment, a case is described in which the present invention is applied to a multifunction device which can be used as a printer, a copier, and a facsimile device. However, recently, image forming devices, in which the common portions of respective software (applications) corresponding to a printer, a copier, a facsimile device and the like are collected together and platformized, have been conceived of. Specifically, such image forming devices are described in Japanese Patent Application No. 2000-204235, Japanese Patent Application No. 2000-204257 and the like. In the second embodiment, a case is described in which the present invention is applied to a multifunction device having a platform in which common portions of the respective applications are collected together.

Figure 10:
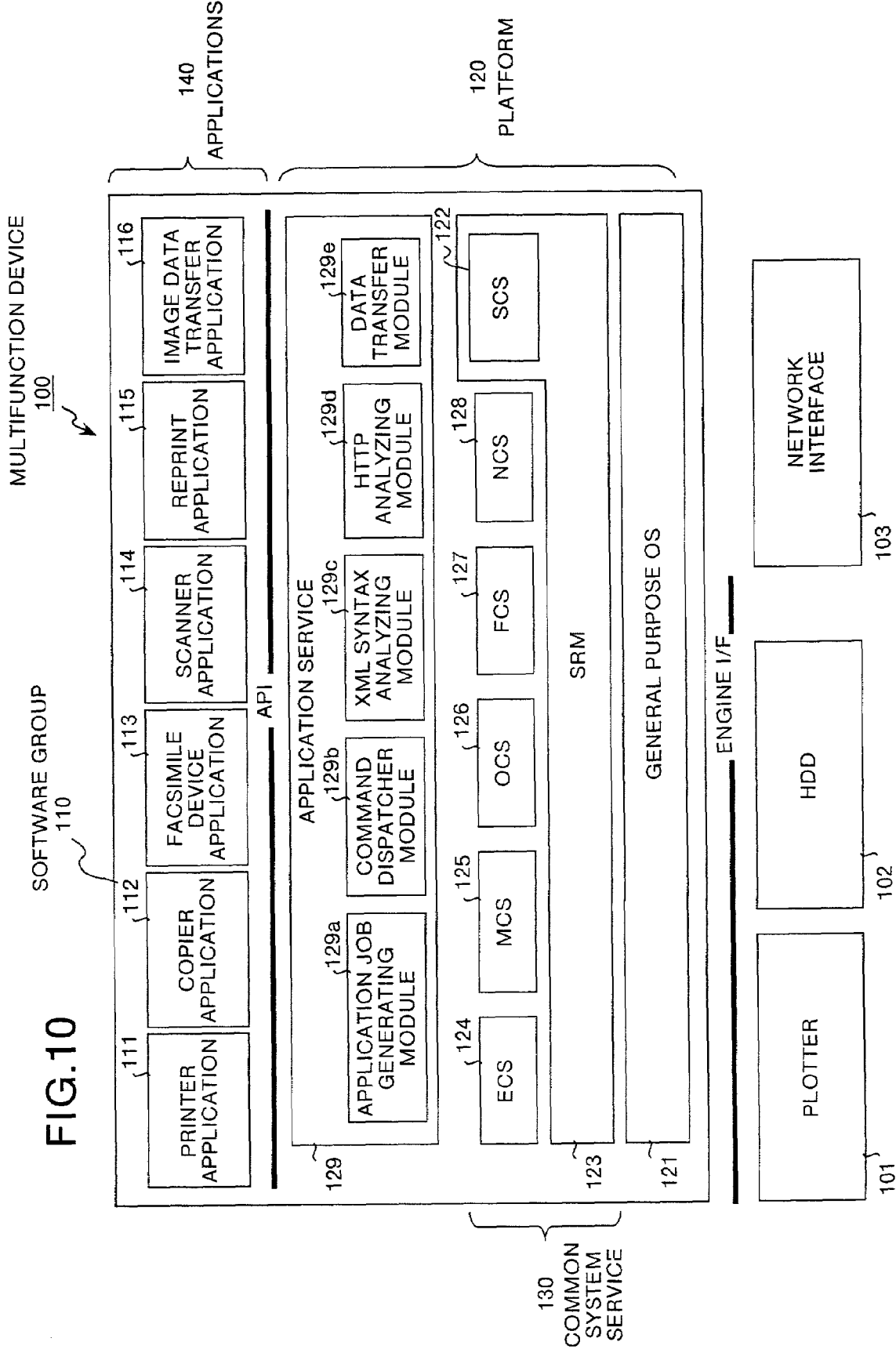
FIG. 10 is a function block diagram which shows the structure of a multifunction device relating to a second embodiment.

First, the structure of the multifunction device relating to the second embodiment will be described. FIG. 10 is a function block diagram which shows the structure of the multi function device relating to the second embodiment. As shown in FIG. 10, a multifunction device 100 has a plotter 101, a hard disk device (HDD) 102, a network interface 103, and the like. A software group 110 is formed from a platform 120 and applications 140.

The platform 120 is formed by a general purpose OS 121, a common system service 130, and an application service 129. The general purpose OS 121 is a wide-use operating system such as UNIX or the like, and executes in parallel the respective software of the platform 120 and the applications 140 as respective processes. By using UNIX of an open source, the stability of the program can be ensured, correspondence with a network is possible, and obtaining of a source code is easy. Further, royalties of the OS, TCP/IP and the like are unnecessary, and outsourcing is easy.

The common system service 130 provides a basic common service for the applications 140, and is formed from an SRM (System Resource Manager) 123 which has an SCS (System Control Service) 122, an ECS (Engine Control Service) 124, an MCS (Memory Control Service) 125, an OCS (Operation panel Control Service) 126, an FCS (Fax Control Service) 127, and an NCS (Network Control Service) 128.

The SRM 123, together with the SCS 122, carries out system control and resource management, and carries out intervention and controls execution in accordance with requests from upper levels using hardware resources such as the engines of the plotter 101 and the scanner and the like, the memory, the HDD 102, the host I/O (the centro I/F, the network interface 103, IEEE1394I/F, RS232CI/F, and the like).

Specifically, the SRM 123 judges whether or not a requested hardware resource can be used (i.e., whether or not it is not being used by other requests), and if use is possible, informs the upper levels that the requested hardware resource can be used. Further, the SRM 123 carries out scheduling of the use of the hardware resources with respect to the requests from the upper levels, and may directly implement the contents of the request (e.g., paper conveying and image creating operation by the printer engine, memory ensuring, file generation, and the like).

The SCS 122 carries out (1) application management, (2) operation section control, (3) system screen display (a job list screen, a counter display screen, and the like), (4) LED display, (5) resource management, and (6) interruption application control. Specifically, in the (1) application management, the SCS 122 carries out registration of the application and processing for notifying other applications of that information. The registered application is notified of the engine state in accordance with a setting of the system or a request setting from the application. Further, an inquiry on the progress of the electricity mode, and a yes/no inquiry for changing the system state such as the interruption mode or the like, are carried out with respect to the applications which have already been registered.

Further, in the (2) operation section control, exclusion control of the right to use the operation section of the application is carried out. Then, key information from the operation section driver (OCS) is notified exclusively to the application having the right to use the operation section. Mask control for temporarily stopping the notification of the key information in accordance with a change in the system state, such as the application is currently being switched, is carried out.

In the (3) system screen display, display of a warning screen corresponding to the engine state is carried out in accordance with the contents of a request from the application having the right to use the operation section. Among these, there are those which turn the warning display on and off in accordance with the state of the application such as a user limiting screen. Other than the engine state, display control of a job list screen for displaying the state of reservations/executions of jobs, a counter screen for displaying the total counter types, and a screen which shows that CSS is being reported, is carried out. These system screen displays are drawn as system screens for covering the application screens, without requesting the application to release the right to use the operation section.

In the (4) LED display, display control of a warning LED and system LEDs such as an application key and the like is carried out. Application-specific LEDs are controlled by the application using a driver for direct display.

In the (5) resource management, when the application (ECS) executes a job, a service for exclusion-controlling an engine resource (scanner, stapler, or the like) which must be excluded, is carried out. In the (6) interruption application control, control and servicing for priority-operating a specific application are carried out.

The ECS 124 controls the plotter 101, the HDD 102, the network interface 103, and the like, and carries out image reading and printing operations, notification of states, jam recovery, and the like.

Specifically, in accordance with a designation of a job mode received from the applications 140, print requests are successively issued by the SRM 123, and a series of copy/scan/print operations is thereby realized. For the job which is the object of handling by the ECS 124, scanner (SCANNER) is designated as the image input device, or plotter (PLOTTER) is designated as the image output device.

For example, in the case of a copy operation, "SCANNER to PLOTTER" is designated. In the case of file accumulation, "SCANNER to MEMORY" is designated. In the case of a facsimile transmission, "SCANNER to FAX_IN" is designated. Further, in a case of printing an accumulated file or printing from a printer application 111, "MEMORY-toPLOTTER" is designated. In the case of facsimile receipt, "FAX_OUT to PLOTTER" is designated.

Although the definition of the job differs in accordance with the application, here, the processing operation for one image group which is handled by the user is defined as one job. For example, in the case of the ADF (Automatic Document Feeder) mode of a copier, the operation of reading the one set of originals which is placed on the original stand is one job. For the pressing plate mode, the operation of reading until the final original is determined is one job. Further, in the case of a copier application 112, the operation for copying one batch of originals is one job. In the case of a fax application 113, the operation for transmitting one document or the operation for receiving one document is one job. In the case of the printer application, the operation for printing one document is one job.

The MCS 125 carries out memory control. Specifically, the MCS 125 carries out acquisition and releasing of the image memory, use of the hard disk device (HDD), compression and decompression of image data, and the like.

In a case in which image data is stored in the HDD, the MCS 125 stores the bibliography information relating to each image data in the HDD in correspondence with the respective image data. Further, in a case of receipt of an erase request which is formed from an HTTP request in which XML data, which describes in XML language that image data and bibliography information stored in the HDD are to be erased, is embedded in a body part, that image data and bibliography information are erased from the HDD.

Examples of functions which are necessary for managing the information needed as image data files accumulated in the hard disk device are (1) a file access (generate/delete/open/close) function (including exclusion processing); (2) file attribute management (management as files of image data in physical page units) such as file name/ID management (file/user)/password management/accumulation time management/number of pages/data format (compression method and the like)/access limiting/generated applications/print condition management, and the like; (3) a function for combining/inserting/cutting in file units and page units; (4) a file sort function (in order of accumulation time/in order of user ID, and the like); (5) notification of all file information (display/for searching); (6) a recovery function (filing of corrupted files/page destruction); (7) a function for deleting files; and the like.

Examples of functions for holding and accessing image data in a memory such as the RAM or the like are (1) a function for acquiring files and page/band attribute information from the applications 140; (2) a function for reserving, releasing, reading (Read) and writing (Write) an image data region from the applications 140; and the like.

The OCS 126 is a module which controls the operation panel which is an information transfer means between the operator and main body control. The OCS 126 carries out processing for notifying the main body control of a key operation event of the operator, processing for providing a library function for each application to construct a GUI, processing for managing, for each application, the constructed GUI information, display reflecting processing on the operation panel, and the like.

The OCS 126 has (1) a function of providing a library for GUI construction; (2) a function of managing operation section hardware resources; (3) a VRAM drawing/LCD display function (hardware display, display application switching, display language switching, window dark color display, message/icon blinking display, message connection display); (4) a hard key input detecting function; (5) a touch panel key input detecting function; (6) an LED output function; (7) a buzzer output function; and the like.

The FCS 127 provides API for carrying out facsimile transmitting and receiving using a PSTN/ISDN network from each application level of the system controller, registration of/referring to various types of facsimile data managed at a BKM (back-up SRAM), facsimile reading, facsimile receiving and printing, and fusion transmitting and receiving.

Specifically, the FCS 127 has (1) a transmitting function for transmitting a document, for which transmission has been requested by an application level, to the facsimile receiver by using a PSTN/ISDN network; (2) a receiving function for carrying out transfer, to the respective application levels, of a facsimile receipt screen received from the PSTN/ISDN network and various types of reports, and for carrying out printing; (3) a telephone directory citation/referral function for carrying out referring to and registration of facsimile management items such as a telephone directory and group information and the like stored in the fax board; (4) a fax log notifying function for notifying transmission/receiving result history information and the like, which are stored in the BKM provided at the fax board, to applications which require such information; (5) an event notifying function for, when there is a change in the state of the fax board, notifying the application which is registered in the FCS of the event that there has been a change; and the like.

The NCS 128 is a module group for providing a service by which the network I/O can be commonly utilized by applications by which it is needed. The NCS 128 carries out allotting, to the respective applications, of the data received by each protocol from the network, and carries out moderation at the time when data is transmitted to the network from the applications. Specifically, the NCS 128 has server daemons such as ftpd, httpd, lpd, snmpd, telnetd, smtpd and the like, as well as client functions of the same protocol.

The application service 129 is one of common services that form the platform 120. The application service 129 differs from the ECS 124, the MCS 125, the OCS 126, the FCS 127, the NCS 128, the SRM 123 and the SCS 122 which form the common system service 130, and provides services set at the applications 140 side.

In other words, the application service 129 is set between the applications 140 and the common system service 130, and serves as a bridge between the two.

Specifically, the application service 129 has an application job generating module 129a which collectively carries out the functions of job generation and data transmission, which functions were originally to have been carried out by the copier application 112, the fax application 113, a scanner application 114, and the like. Thus, it suffices for the copier application 112, the fax application 113, the scanner application 114 and the like to mainly have screens and key operations as their objects, and thus, the efficiency of developing the applications improves.

The application service 129 has a command dispatcher module 129b, an XML syntax analyzing module 129c, an HTTP analyzing module 129d, and a data transfer module 129e. These modules are all provided between the common system service 130 and the applications 140, and are modules which serve as bridges between the two.

The HTTP analyzing module 129d is a module which analyzes the contents of HTTP data received via the network interface 103. The XML syntax analyzing module 129c is a module which carries out syntax analysis of XML syntax of data analyzed by the HTTP analyzing module 129d.

The command dispatcher module 129b is a module which, on the basis of the results of analysis by the XML syntax analyzing module 129c, selects the corresponding application.

The data transfer module 129e is a module which, in cooperation with the MCS 125 and the NCS 128, transfers the data stored in the HDD 102 or the memory to the computer at the network address which is designated through the network interface 103. The data transfer module 129e transfers data in accordance with FTP or the like.

Specifically, the data transfer module 129e transfers, to an external device (a computer), transfer contents which are formed by the image data and/or the bibliography information stored in the HDD 102. At this time, the data transfer module 129e selects, on the basis of the application generating the image data, one of transfer contents for transferring only the bibliography information, transfer contents for transferring both the image data and the bibliography information, and transfer contents for not transferring the image data and the bibliography information.

In a case in which the transfer contents for transferring both the image data and the bibliography information are selected, the image data and the bibliography information can be transferred at different times. For example, the bibliography information can be transferred to the external device at the time when the image data is accumulated in the HDD 102, and the image data can be transferred to the external device at a predetermined time.

Further, the network traffic may be observed, and the bibliography information may be transferred to the external device at the time when the image data is accumulated in the HDD 102, and the image data may be transferred to the external device in a case in which the observed amount of traffic is less than a predetermined amount of traffic.

Moreover, the bibliography information may be transferred to the external device at the time when the image data is accumulated in the HDD 102, and the image data may be transferred to the external device in response to a request from the external device. In this case, a transfer request, which is formed from an HTTP request in which XML data is embedded in the body part, is received from the external device.

The applications 140 has the printer application 111 which is an application for a printer; the copier application 112 which is an application for a copier; the fax application 113 which is an application for a facsimile device; the scanner application 114 which is an application for a scanner; a reprint application 115 which is an application for reprinting; and an image data transfer application 116 which is an application for the transfer of image data. Note that, in addition thereto, a process inspection application which is an application for the inspection of processes may be provided.

The reprint application 115 is an application which receives an HTTP request for reprinting via the network interface section 103 and which functions at a point in time selected by the command dispatcher module. Specifically, the reprint application 115 instructs the application job generating module 129*a* to generate a job for reprinting, at the plotter 101, the designated image data accumulated in the HDD 102 or the like.

The image data transfer application 116 is an application which receives an HTTP request for image data transfer via the network interface section 103, and functions at a point in time selected by the command dispatcher module. Specifically, the image data transfer application 116 instructs the data transfer module 129*e* to generate a job for reprinting at the plotter 101 which carries out data transfer module processing such that the designated image data accumulated in the HDD 102 or the like is data transferred to the computer which is the source of the request.

As for the respective applications 111 to 116, because the operations can be executed by using respective processes on the platform 120, the screen display control program is the main part thereof. In particular, because the application service 129 is provided on the platform 120, there is no need to provide functions of job generation and data communication.

Figure 11:
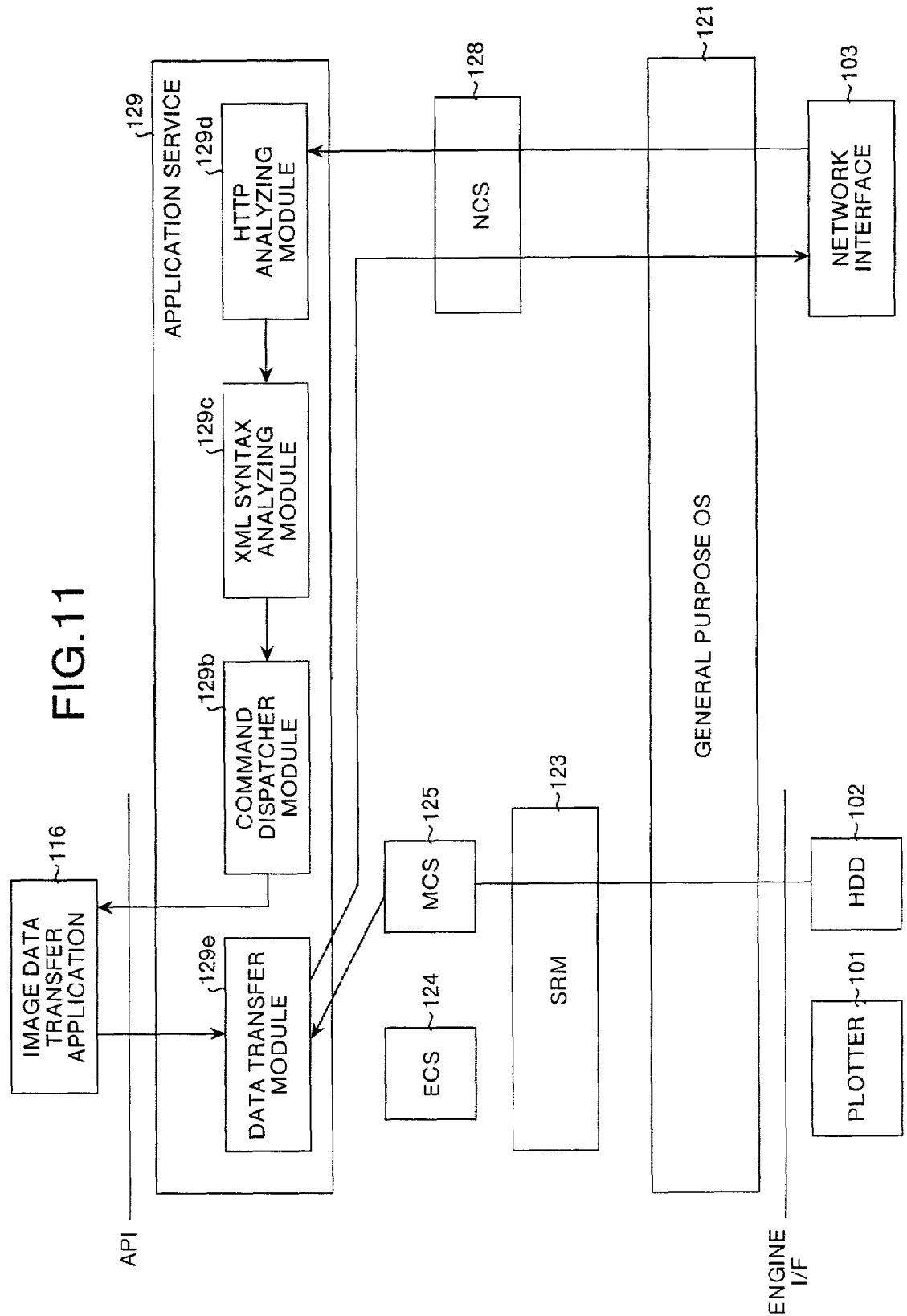
FIG. 11 is an explanatory diagram for explaining transfer operation of image data using the image data transfer application shown in FIG. 10.

Next, the image data transfer operation using the image data transfer application 116 shown in FIG. 10 will be described concretely. FIG. 11 is an explanatory diagram for explaining the transfer operation of image data using the image data transfer application 116 shown in FIG. 10. However, here, for convenience of explanation, at the common system service 130, only the SRM 123, the ECS 124, the MCS 125 and the NCS 128 are illustrated.

As shown in FIG. 11, when the multifunction device 100 receives HTTP data from the network interface 103, this HTTP data is analyzed by the HTTP analyzing module 129*d*, and in particular, the XML language description portion is analyzed by the XML syntax analyzing module 129*c*.

Thereafter, on the basis of these results of analysis, the command dispatcher module 129*b* selects the image data transfer application 116, and gives notice that data transfer has been received via the network.

The image data transfer application 116 which receives this notice instructs the data transfer module 129*e* to carry out data transfer of the designated image data. The data transfer module 129*e* operates in coordination with the MCS 125 and the NCS 128, and transfers, via the network interface 103, that image data accumulated in the HDD 102.

In this way, in a case in which an HTTP request, which is a request for transfer of image data, is received, the image data stored in the HDD 102 can be transferred to the computer which is the source of the request, by using the HTTP analyzing module 129*d*, the XML syntax analyzing module 129*c*, the command dispatcher module 129*b*, and the data transfer module 129*e* within the application service 129.

Figure 12:
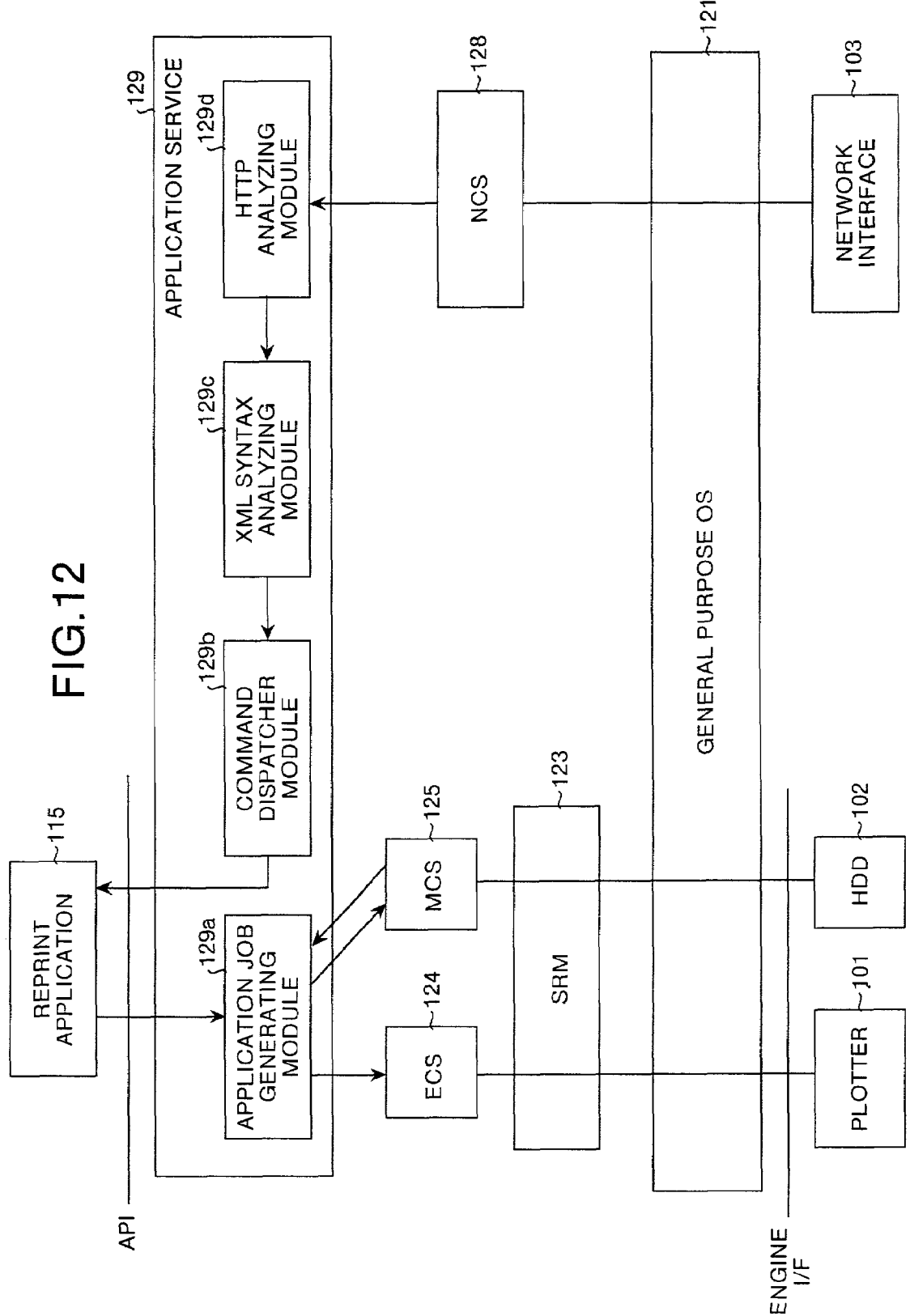
FIG. 12 is an explanatory diagram for explaining reprint operation of image data using the reprint application shown in FIG. 10.

Next, the operation of reprinting image data by using the reprint application 115 shown in FIG. 10 will be described in further detail. FIG. 12 is an explanatory diagram for explaining the image data reprinting operation using the reprint application 115 shown in FIG. 10. However, here as well, for convenience of explanation, at the common system service 130, only the SRM 123, the ECS 124, the MCS 125 and the NCS 128 are illustrated.

As shown in FIG. 12, when the multifunction device 100 receives HTTP data from the network interface 103, this HTTP data is analyzed by the HTTP analyzing module 129*d*, and in particular, the XML language description portion is analyzed by the XML syntax analyzing module 129*c*.

Thereafter, on the basis of these results of analysis, the command dispatcher module 129*b* selects the reprint application 115, and gives notice that a reprint instruction has been received via the network.

The reprint application 115 which receives this notice instructs the application job generating module 129*a* to generate a reprint job of the designated image data. The application job generating module 129*a* operates in coordination with the ECS 124, the MCS 125 and the NCS 128, and reprints, by the plotter 101, that image data accumulated in the HDD 102.

In this way, in a case in which an HTTP request, which is a request for reprinting of image data, is received, the image data stored in the HDD 102 can be reprinted at the plotter 101, by using the HTTP analyzing module 129*d*, the XML syntax analyzing module 129*c*, the command dispatcher module 129*b*, and the application job generating module 129*a* within the application service 129.

As described above, in accordance with the second embodiment, within the application service 129, which is provided between the common system service 130 and the applications 140, are provided the application job generating module 129*a*, the command dispatcher modules 129*b*, the XML syntax analyzing module 129*c*, the HTTP analyzing module 129*d*, and the data transfer module 129*e*. Thus, even in cases in which an instruction to reprint image data or a request to transfer image data, which is formed from HTTP data described in XML language, is received via a network, such requests can be addressed.

In the above-described second embodiment, a case is shown in which the application service 129 is provided between the common system service 130 and the applications 140. However, the present invention is not limited to the same, and can also be applied to a case in which the application service 129 is not provided. In the third embodiment, a case is described in which processings of the application service 129 are carried out by the applications 140.

Figure 13:
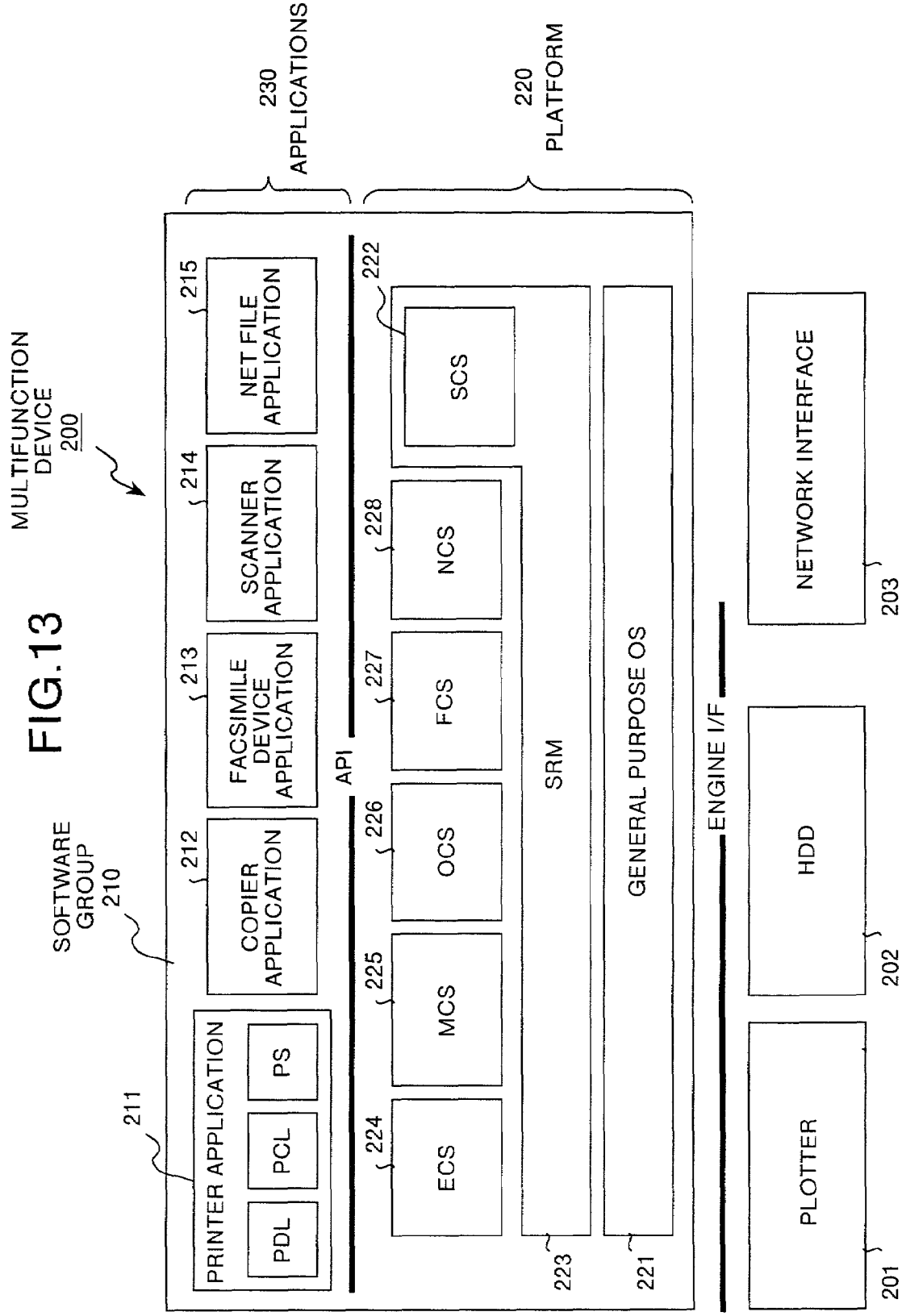
FIG. 13 is a function block diagram which shows the structure of a multifunction device relating to a third embodiment.

First, the structure of the multifunction device relating to the third embodiment will be described. FIG. 13 is a function block diagram which shows the structure of the multifunction device relating to the third embodiment. As shown in FIG. 13, a multifunction device 200 has a plotter 201, a hard disk device (HDD) 202, a network interface 203, and the like. A software group 210 is formed from a platform 220 and applications 240.

The platform 220 is formed from a general purpose OS 221, an SRM (System Resource Manager) 223 which has an SCS (System Control Service) 222, an ECS (Engine Control Service) 224, an MCS (Memory Control Service) 225, an OCS (Operation panel Control Service) 226, an FCS (Fax Control Service) 227, and an NCS (Network Control Service) 228. Note that, because these respective sections are the same as those shown in FIG. 10, detailed description thereof is omitted here.

The applications 230 has a printer application 211 which is an application for a printer; a copier application 212 which is an application for a copier; a fax application 213 which is an application for a facsimile device; a scanner application 214 which is an application for a scanner; and a net file application 215 which is an application for reprinting and for transferring image data. Note that, in addition thereto, a process inspection application which is an application for the inspection of processes may be provided.

The net file application 115 is an application which receives an HTTP request for reprinting via the network interface section 103 and which selects the processing contents by the command dispatcher module. Specifically, the net file application 115 carries out processing for generating a job for reprinting at the plotter 101 the designated image data accumulated in the HDD 102 or the like, and carries out processing for data transferring, to the computer which is the source of the request, the designated image data accumulated in the HDD 102 or the like.

Figure 14:
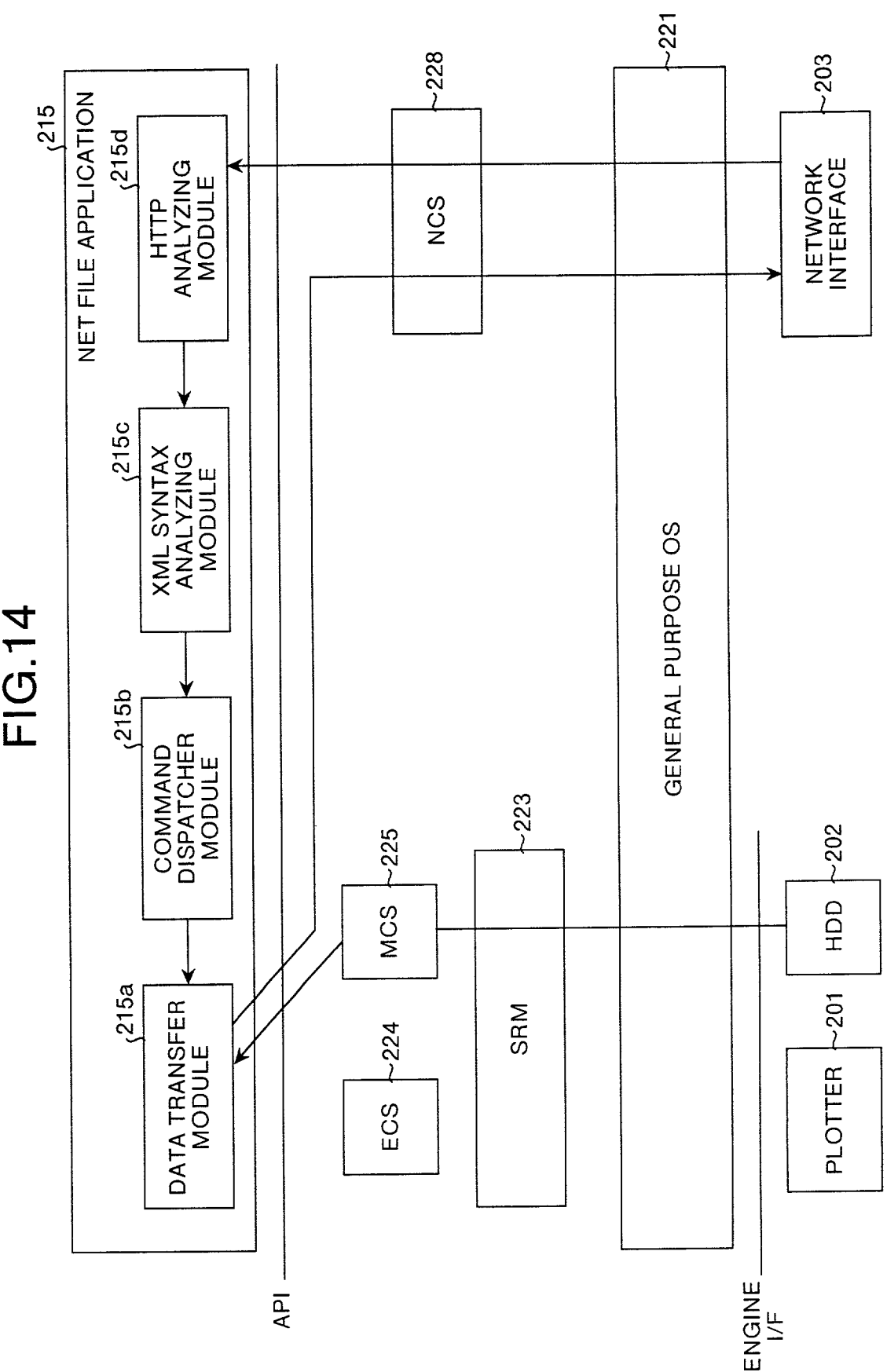
FIG. 14 is an explanatory diagram for explaining transfer operation of image data using the net file application shown in FIG. 13.

Next, the image data transfer operation using the net file application 215 shown in FIG. 13 will be described in further detail. FIG. 14 is an explanatory diagram for explaining the image data transfer operation using the net file application 215 shown in FIG. 13.

As shown in FIG. 14, the net file application 215 has a command dispatcher module 215b, an XML syntax analyzing module 215c, an HTTP analyzing module 215d, and a data transfer module 215e.

The HTTP analyzing module 215d is a module which analyzes the contents of HTTP data received via the network interface 103. The XML syntax analyzing module 215c is a module which carries out syntax analysis of XML syntax of data analyzed by the HTTP analyzing module 215d.

The command dispatcher module 215b is a module which, on the basis of the results of analysis by the XML syntax analyzing module 215c, selects the corresponding application.

The data transfer module 215e is a module which, in cooperation with the MCS 225 and the NCS 228, transfers the data stored in the HDD 202 or the memory to the computer at the network address which is designated through the network interface 203. Specifically, the data transfer module 215e transfers data in accordance with FTP or the like.

Then, when the multifunction device 200 receives HTTP data from the network interface 203, this HTTP data is analyzed by the HTTP analyzing module 215d, and in particular, the XML language description portion is analyzed by the XML syntax analyzing module 215c.

Thereafter, on the basis of these results of analysis, the command dispatcher module 215b selects the data transfer module 215e. The data transfer module 215e operates in coordination with the MCS 225 and the NCS 228, and transfers, via the network interface 203, that image data accumulated in the HDD 202.

In this way, in a case in which the net file application 215 receives an HTTP request which is a request for transfer of image data, the image data stored in the HDD 202 can be transferred to the computer which is the source of the request, by using the HTTP analyzing module 215d, the XML syntax analyzing module 215c, the command dispatcher module 215b, and the data transfer module 215e.

Figure 15:
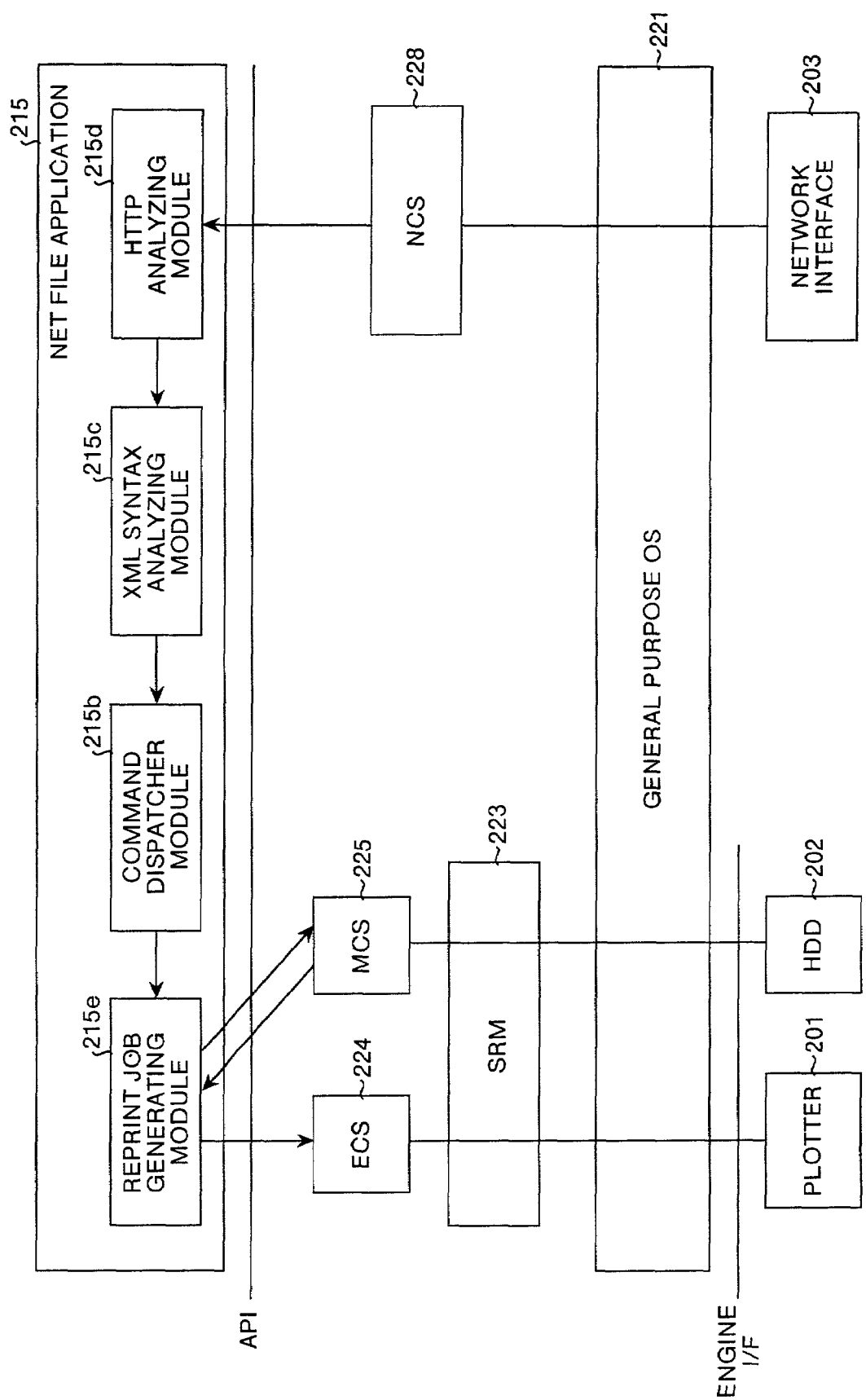
FIG. 15 is an explanatory diagram for explaining reprint operation of image data using the net file application shown in FIG. 13.

Next, the image data reprinting operation using the net file application 215 shown in FIG. 13 will be described in further detail. FIG. 15 is an explanatory diagram for explaining the image data reprinting operation using the net file application 215 shown in FIG. 13.

As shown in FIG. 15, the net file application 215 has a reprint job generating module 215a, in addition to the aforementioned command dispatcher module 215b, XML syntax analyzing module 215c, HTTP analyzing module 215d and data transfer module 215e.

The reprint job generating module 215a is a module which operates at the time when the multifunction device 200 receives HTTP data expressing a reprint instruction and the reprint job generating module 215a is selected by the command dispatcher module 215b. Specifically, the reprint job generating module 215a generates a reprint job for reprinting the requested printing data.

Specifically, when the multifunction device 200 receives HTTP data from the network interface 203, this HTTP data is analyzed by the HTTP analyzing module 215d, and in particular, the XML language description portion is analyzed by the XML syntax analyzing module 215c.

Thereafter, when the command dispatcher module 215bselects the reprint job generating module 215a on the basis of these results of analysis, the reprint job generating module 215a operates in coordination with the ECS 224, the MCS 225 and the NCS 228, and reprints, by the plotter 201, that image data accumulated in the HDD 202.

In this way, in a case in which an HTTP request, which is a request for reprinting of image data, is received, the image data stored in the HDD 202 can be reprinted at the plotter 201, by using the HTTP analyzing module 215d, the XML syntax analyzing module 215c, the command dispatcher module 215b, and the application job generating module 215a.

As described above, in accordance with the third embodiment, the net file application 215, which carries out reprinting and data transfer, is provided as one of the applications 230. Within this net file application 215 are provided the reprint job generating module 215a, the command dispatcher module 215b, the XML syntax analyzing module 215c, the HTTP analyzing module 215d, and the data transfer module 215e. Thus, even in cases in which an instruction to reprint image data or a request to transfer image data, which is formed from HTTP data described in XML language, is received via a network, such requests can be addressed.

Note that, in the third embodiment, the net file application 215 is provided as one of the applications 230, which is different than the above-described second embodiment. Thus, there is the advantage that there is no need to update the platform 220. However, the disadvantage arises that, for example, the HTTP analyzing module 215*d* or the like must have plural independent applications.

Note that, in the above-described second and third embodiments, cases are described in which a data transfer request or a reprinting request by an HTTP request from an external device is carried out. However, the present invention is not limited to the same. The present invention is also applicable to cases in which the following are carried out: a print request formed from an HTTP request in which XML data, which describes in XML language that image data is to be printed, is embedded in the body part; a fax transmission request formed from an HTTP request in which XML data, which describes in XML language that image data is to be fax transmitted, is embedded in the body part; and an erase request formed from an HTTP request in which XML data, which describes in XML language that image data and bibliography information are to be erased, is embedded in the body part.

In the above-described second and third embodiments, cases are described in which the HTTP analyzing module, the XML syntax analyzing module and the command dispatcher module are provided at one of the platform side and the applications side. However, the present invention is not limited to the same, and it is possible to provide only the HTTP analyzing module on the platform, and to provide the other modules at the applications side.

Thus, in the fourth embodiment, this point will be explained while considering a case in which the present invention is packaged in a multifunction device. Note that, here, a case is described in which an image document operation application is provided as one of plural applications.

Figure 16:
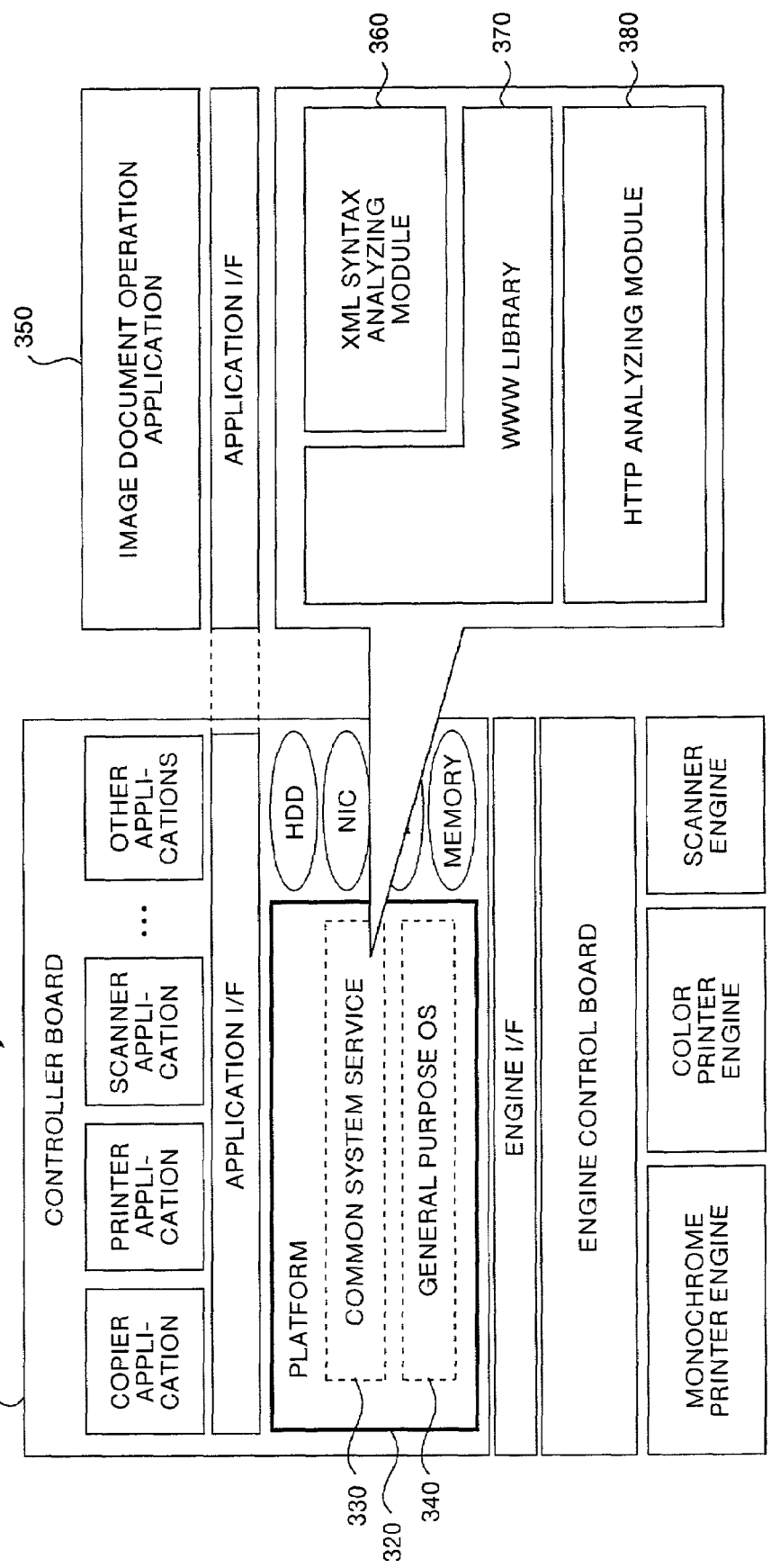
FIG. 16 is an explanatory diagram for explaining a case in which the image forming device relating to the present invention is packaged as a multifunction device.
Figure 17:
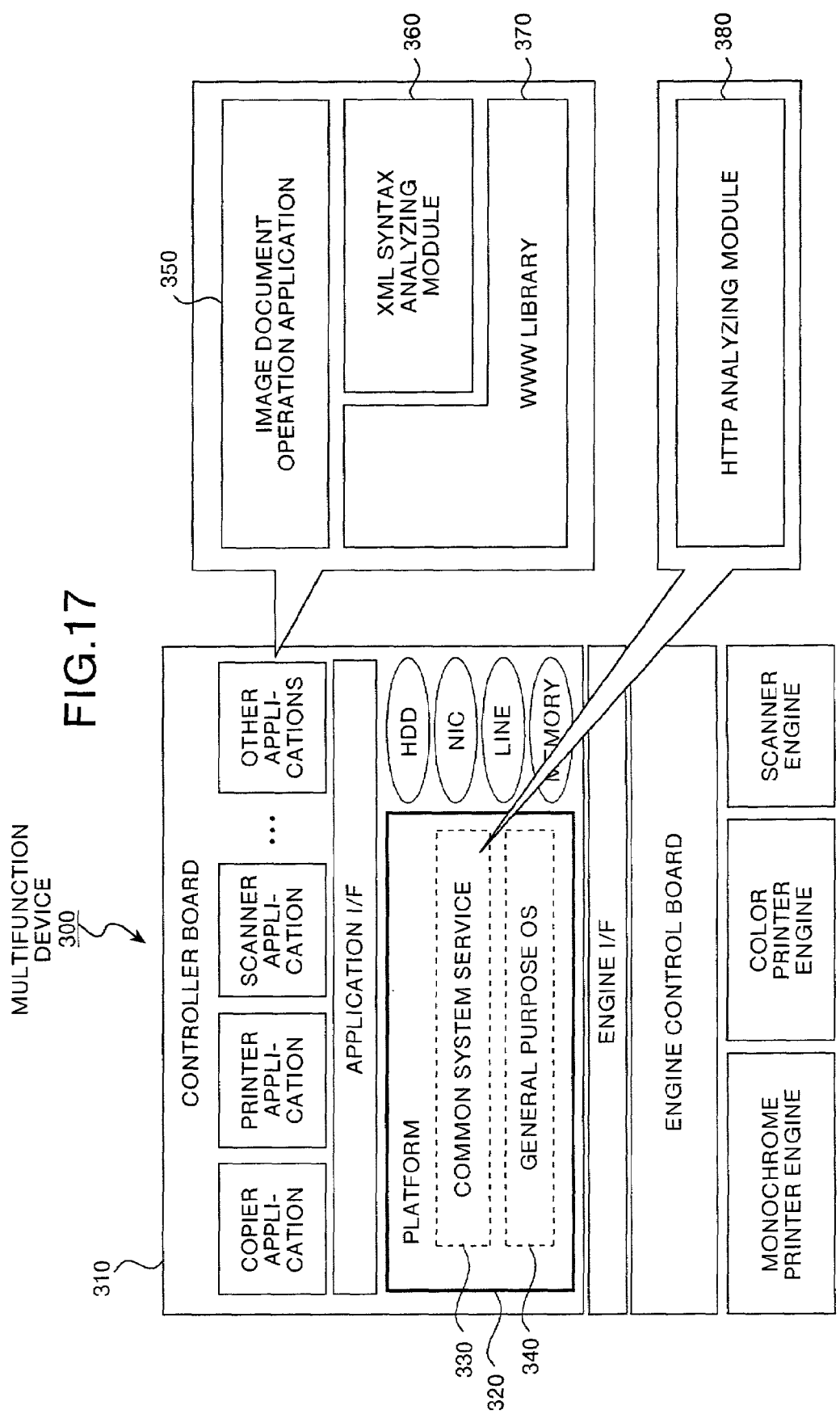
FIG. 17 is an explanatory diagram for explaining a case in which the image forming device relating to the present invention is packaged as a multifunction device.

FIG. 16 and FIG. 17 are explanatory diagrams for explaining cases in which the image forming device relating to the present invention is packaged as a multifunction device. As shown in these figures, at a multifunction device 300, a platform and respective applications are provided on a controller board 310. An application I/F is connected between the two, and the controller board 310 is connected to an engine control board via an engine I/F.

At a platform 320, a common system service 330 is provided above a general purpose OS 340. Due to the common system service 330, services common to the respective applications which have already been described are provided.

FIG. 16 shows a case in which, similarly to the above-described second embodiment, an HTTP analyzing module 380, a WWW library, an XML analyzing module and the like are provided within the common system service 330.

In contrast, FIG. 17 shows a case in which only the HTTP analyzing module 380 is provided within the common system service 330, and an XML syntax analyzing module 360 and the like are provided at the applications side.

In this way, in order to be able to access the HTTP server, which is an external device, from the respective applications, it is desirable to provide the HTTP analyzing module 380 within the common system service 330. However, because it is not always the case that each HTTP server corresponds to XLM language, the XML analyzing module 360 can be provided at the applications side.

Further, although not illustrated, as shown in FIG. 16, even in a case in which the XML analyzing module 360 is provided at the platform 330 side, the above-described command dispatcher module may be provided at either the platform or at the applications side.

As described above, in the fourth embodiment, the HTTP analyzing module 380 is provided at the platform 330 side, and the XML analyzing module 350 is provided at the applications side. Thus, it is possible to form a platform by only a module which is used frequently.

As described above, according to one aspect of this invention, it is structured such that bibliography information relating to respective image data are stored in a mass storage device in correspondence with the respective image data, and transfer contents which are to be transferred to an external device are selected from among the image data and the bibliography information stored in the mass storage device. Thus, for example, in a case in which the image processing device is a digital multifunction device or the like, which is provided with a facsimile application and a printer application and the like in addition to a copier application, or in a case in which there are problems with the network environment, the image data and the bibliography information stored in the mass storage device can be selectively transferred to the external device in accordance with the various applications and the network environment. Thus, because it is possible to construct a system corresponding to various applications and a network environment, the ease of usage can be improved.

Furthermore, it is structured such that one of transfer contents for transferring only bibliography information, transfer contents for transferring both image data and bibliography information, and transfer contents for not transferring the image data and the bibliography information, are selected. Thus, due to the transfer of the image data and the bibliography information stored in the mass storage device being prescribed in three patterns, selection which corresponds to the various applications or the network environment is easy.

Moreover, it is structured such that the transfer contents are selected on the basis of the application which generates the image data accumulated in the mass storage device. Thus, for example, in a case in which the application attaches importance to image quality at the time of reprinting, it is possible to not transfer the image data and to only transfer the bibliography information. In a case in which the application exhibits an image perusal function at the external device, a setting can be made such that both the image data and the bibliography information are transferred.

Furthermore, it is structured such that, in a case in which the transfer contents for transferring both the image data and the bibliography information are selected, the image data and the bibliography information are transferred at different times. Thus, in an environment having low network performance, the load on the network can be reduced.

Moreover, it is structured such that the bibliography information is transferred to the external device at the time the image data is accumulated in the mass storage device, and the image data is transferred to the external device at a predetermined time. Thus, in an environment having low network performance, image data can be transferred during the nighttime which is a time period when users are few, and the load on the network can be reduced Furthermore, it is structured such that the traffic of the network is observed, and the bibliography information is transferred to the external device at the time when the image data is accumulated in the mass storage device, and the image data is transferred to the external device in a case in which the observed amount of traffic is less than a predetermined amount of traffic. Thus, in an environment having low network performance, image data can be transferred at a time when network traffic is light, and the load on the network can be reduced.

Moreover, it is structured such that the bibliography information is transferred to the external device at the time when image data is accumulated in the mass storage device, and the image data is transferred to the external device in response to a request from the external device. Thus, in an environment having low network performance, it is possible to transfer image data only in cases in which there is a transfer request from the external device, and the load on the network can be reduced.

Furthermore, it is structured such that a service is offered to the client in accordance with HTTP protocol, and the description contents which are described in XML language are analyzed. Thus, a request from an external device can be carried out flexibly by using XML language.

Moreover, it is structured such that a request from the external device is a transfer request which is formed by an HTTP request in which XML data is embedded in the body part. Thus, a transfer request from an external device can be carried out flexibly by using XML language.

Furthermore, it is structured such that the request from the external device is a print request which is formed from an HTTP request in which XML data, which describes in XML language that image data is to be printed, is embedded in the body part. Thus, a print request from an external device can be carried out flexibly by using XML language.

Moreover, it is structured such that the request from the external device is a fax transmission request which is formed from an HTTP request in which XML data, which describes in XML language that image data is to be fax transmitted, is embedded in the body part. Thus, a print request from an external device can be carried out flexibly by using XML language.

Furthermore, it is structured such that the request from the external device is an erase request which is formed from an HTTP request in which XML data, which describes in XML language that image data and bibliography information stored in the mass storage device are to be erased, is embedded in the body part. Thus, an erase request from an external device can be carried out flexibly by using XML language.

Moreover, it is structured such that the image data and the bibliography information are transferred to an FTP server by using a PUT command of FTP. Thus, by making the external device an FTP server, transfer of image data and bibliography information is easy.

According to another aspect of this invention, it is structured such that bibliography information relating to respective image data are stored in a mass storage device in correspondence with the respective image data, and transfer contents which are to be transferred to an external device are selected from among the image data and the bibliography information stored in the mass storage device. Thus, for example, in a case in which the image processing device is a digital multifunction device or the like, which is provided with a facsimile application and a printer application and the like in addition to a copier application, or in a case in which there are problems with the network environment, the image data and the bibliography information stored in the mass storage device can be selectively transferred to the external device in accordance with the various applications and the network environment. Thus, because it is possible to construct a system corresponding to various applications and a network environment, the ease of usage can be improved.

Furthermore, it is structured such that one of transfer contents for transferring only bibliography information, transfer contents for transferring both image data and bibliography information, and transfer contents for not transferring the image data and the bibliography information, are selected. Thus, due to the transfer of the image data and the bibliography information stored in the mass storage device being prescribed in three patterns, selection which corresponds to the various applications or the network environment is easy.

Moreover, it is structured such that the transfer contents are selected on the basis of the application which generates the image data accumulated in the mass storage device. Thus, for example, in a case in which the application attaches importance to image quality at the time of reprinting, it is possible to not transfer the image data and to only transfer the bibliography information. In a case in which the application exhibits an image perusal function at the external device, a setting can be made such that both the image data and the bibliography information are transferred.

Furthermore, it is structured such that, in a case in which the transfer contents for transferring both the image data and the bibliography information are selected, the image data and the bibliography information are transferred at different times. Thus, in an environment having low network performance, the load on the network can be reduced.

Moreover, it is structured such that the bibliography information is transferred to the external device at the time the image data is accumulated in the mass storage device, and the image data is transferred to the external device at a predetermined time. Thus, in an environment having low network performance, image data can be transferred during the nighttime which is a time period when users are few, and the load on the network can be reduced Furthermore, it is structured such that the traffic of the network is observed, and the bibliography information is transferred to the external device at the time when the image data is accumulated in the mass storage device, and the image data is transferred to the external device in a case in which the observed amount of traffic is less than a predetermined amount of traffic. Thus, in an environment having low network performance, image data can be transferred at a time when network traffic is light, and the load on the network can be reduced.

Moreover, it is structured such that the bibliography information is transferred to the external device at the time when image data is accumulated in the mass storage device, and the image data is transferred to the external device in response to a request from the external device. Thus, in an environment having low network performance, it is possible to transfer image data only in cases in which there is a transfer request from the external device, and the load on the network can be reduced.

Furthermore, it is structured such that a service is offered to the client in accordance with HTTP protocol, and the description contents which are described in XML language are analyzed. Thus, a request from an external device can be carried out flexibly by using XML language.

Moreover, it is structured such that a request from the external device is a transfer request which is formed by an HTTP request in which XML data is embedded in the body part. Thus, a transfer request from an external device can be carried out flexibly by using XML language.

Furthermore, it is structured such that the request from the external device is a print request which is formed from an HTTP request in which XML data, which describes in XML language that image data is to be printed, is embedded in the body part. Thus, a print request from an external device can be carried out flexibly by using XML language.

Moreover, it is structured such that the request from the external device is a fax transmission request which is formed from an HTTP request in which XML data, which describes in XML language that image data is to be fax transmitted, is embedded in the body part. Thus, a print request from an external device can be carried out flexibly by using XML language.

Furthermore, it is structured such that the request from the external device is an erase request which is formed from an HTTP request in which XML data, which describes in XML language that image data and bibliography information stored in the mass storage device are to be erased, is embedded in the body part. Thus, an erase request from an external device can be carried out flexibly by using XML language.

Moreover, it is structured such that the image data and the bibliography information are transferred to an FTP server by using a PUT command of FTP. Thus, by making the external device an FTP server, transfer of image data and bibliography information is easy.

Furthermore, it is a program for executing on a computer the method recited in any one of claims 14 to 26. Thus, the operations of any one of claims 14 to 26 can be realized by a computer.

According to still another aspect of this invention, it is structured such that a memory control module, which stores, in a storage section, bibliography information relating to respective image data in correspondence with the respective image data, and a data transfer module, which transfers, to an external device, transfer contents which are formed from the image data and/or the bibliography information stored in the storage portion, are provided on a platform. Thus, image data and bibliography information can be transferred to the external device commonly for the respective applications.

Furthermore, it is structured such that the data transfer application, which transfers data, which is stored in the storage section, in response to a data transfer instruction through the network, is provided as one of plural applications. Thus, data transfer can be carried out by using an application used exclusively therefor.

Moreover, it is structured such that the data transfer module selects one of transfer contents for transferring only bibliography information, transfer contents for transferring both image data and bibliography information, and transfer contents for not transferring the image data and the bibliography information. Thus, one or both of the image data and the bibliography information can be transferred in accordance with the conditions.

Furthermore, it is structured such that the data transfer module selects the transfer contents on the basis of the application which generates the image data accumulated in the storage section. Thus, the data needed by the application can be transferred.

Moreover, it is structured such that, in a case in which the transfer contents for transferring both the image data and the bibliography information are selected by the data transfer module, the image data and the bibliography information are transferred at different times. Thus, in an environment having low network performance, the load on the network can be reduced.

Furthermore, it is structured such that the bibliography information is transferred to the external device at the time the image data is accumulated in the storage section, and the image data is transferred to the external device at a predetermined time. Thus, in an environment having low network performance, image data can be transferred during the nighttime which is a time period when users are few, and the load on the network can be reduced Moreover, it is structured such that the data transfer module observes the traffic of the network, and the bibliography information is transferred to the external device at the time when the image data is accumulated in the storage section, and the image data is transferred to the external device in a case in which the observed amount of traffic is less than a predetermined amount of traffic. Thus, in an environment having low network performance, image data can be transferred at a time when network traffic is light, and the load on the network can be reduced.

Furthermore, it is structured such that the bibliography information is transferred to the external device at the time when image data is accumulated in the storage section, and the image data is transferred to the external device in response to a request from the external device. Thus, in an environment having low network performance, it is possible to transfer image data only in cases in which there is a transfer request from the external device, and the load on the network can be reduced.

According to still another aspect of this invention, it is structured such that a network control service, which controls network communication with the external device, and an HTTP analyzing module, which analyzes the contents of HTTP command data inputted from the external device via the network, are provided at a platform. Thus, the HTTP server can be used in common for the respective applications.

Furthermore, it is structured such that an XML syntax analyzing module, which carries out syntax analysis of the XML syntax of the data analyzed by the HTTP analyzing module, is provided at the platform. Thus, XML syntax analysis can be carried out in common for the respective applications.

Moreover, it is structured such that a command dispatcher module, which selects a corresponding application on the basis of the results of analysis by the XML syntax analyzing module, is provided at the platform. Thus, selection of the application can be carried out smoothly.

Furthermore, it, the HTTP command data is a transfer request formed from an HTTP request in which XML data is embedded in the body part. Thus, a transfer request can be carried out by an HTTP request described in XML language.

Moreover, it, the HTTP command data is a print request formed from an HTTP request in which XML data, which describes in XML language that image data is to be printed by the printing section, is embedded in the bodypart. Thus, a print request can be carried out by an HTTP request described in XML language.

Furthermore, it, a fax control service module, which controls fax communications, is provided at the platform. The HTTP control data is a fax transmission request formed from an HTTP request in which XML data, which describes in XML language that image data is to be fax transmitted by the fax control service module, is embedded in the body part. Thus, a fax transmission request can be carried out by an HTTP request described in XML language.

Moreover, it, when a memory control module receives an erase request formed from an HTTP request in which XML data, which describes in XML language that the image data and the bibliography information stored in the storage section are to be erased, is embedded in the body part, that image data and bibliography information are erased from the storage section. Thus, a data erase request can be carried out by an HTTP request described in XML language.

The present document incorporates by reference the entire contents of Japanese priority documents, 2000-337611 filed in Japan on Nov. 6, 2000 and 2001-100583 filed in Japan on Mar. 30, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing device comprising:
a mass storage device which can store a large number of image data, wherein the image processing device accumulates, in the mass storage device, image data generated in accordance with execution of an application relating to image data processing, and transfers image data accumulated in the mass storage device to an external device connected to a network;
a bibliography information storing unit which stores, in the mass storage device and in correspondence with respective image data, bibliography information relating to the respective image data; and
a transfer contents selecting unit which selects, from among the image data and the bibliography information stored in the mass storage device, transfer contents to be transferred to the external device,
wherein the bibliography information is transferred to the external device at the time the image data is accumulated in the mass storage device, and the image data is transferred to the external device at a predetermined time.

2. An image processing device comprising:
a mass storage device which can store a large number of image data, wherein the image processing device accumulates, in the mass storage device, image data generated in accordance with execution of an application relating to image data processing, and transfers image data accumulated in the mass storage device to an external device connected to a network;
a bibliography information storing unit which stores, in the mass storage device and in correspondence with respective image data, bibliography information relating to the respective image data; and
a transfer contents selecting unit which selects, from among the image data and the bibliography information stored in the mass storage device, transfer contents to be transferred to the external device, and
a network observing unit which observes traffic of the network,
wherein the bibliography information is transferred to the external device at the time when the image data is accumulated in the mass storage device, and the image data is transferred to the external device in a case in which an amount of traffic observed by the network observing unit is less than a predetermined amount of traffic.

3. An image processing device comprising:
a mass storage device which can store a large number of image data, wherein the image processing device accumulates, in the mass storage device, image data generated in accordance with execution of an application relating to image data processing, and transfers image data accumulated in the mass storage device to an external device connected to a network;
a bibliography information storing unit which stores, in the mass storage device and in correspondence with respective image data, bibliography information relating to the respective image data; and
a transfer contents selecting unit which selects, from among the image data and the bibliography information stored in the mass storage device, transfer contents to be transferred to the external device,
wherein the bibliography information is transferred to the external device at the time when the image data is accumulated in the mass storage device, and the image data is transferred to the external device in response to a request from the external device.

4. The image processing device according to claim 3, further comprising an HTTP server unit which provides a service to a client in accordance with HTTP protocol, and an XML analyzing unit which analyzes description contents which are described in XML language.

5. The image processing device according to claim 4, wherein the request from the external device is a transfer request which is formed from an HTTP request in which XML data is embedded in a body part.

6. The image processing device according to claim 4, further comprising a printing unit which prints the image data, wherein the request from the external device is a print request which is formed from an HTTP request in which XML data, which describes in XML language that image data is to be printed by the printing unit, is embedded in a body part.

7. The image processing device according to claim 4, further comprising a fax transmitting unit which transmits by fax the image data, wherein the request from the external device is a fax transmission request which is formed from an HTTP request in which XML data, which describes in XML language that image data is to be fax transmitted by the fax transmitting unit, is embedded in a body part.

8. The image processing device according to claim 4, further comprising an erasing unit which erases image data and bibliography information stored in the mass storage device, wherein the request from the external device is an erase request which is formed from an HTTP request in which XML data, which describes in XML language that image data and bibliography information stored in the mass storage device are to be erased, is embedded in a body part.

9. An image processing method comprising:
an accumulating step of accumulating, in a mass storage device which can store a large number of image data, image data which are generated in accordance with execution of an application relating to image data processing;
a transferring step of transferring, to an external device connected to a network, image data accumulated in the mass storage device;
a bibliography information storing step of storing, in the mass storage device and in correspondence with respective image data, bibliography information relating to the respective image data; and
a transfer contents selecting step of selecting, from among the image data and the bibliography information stored in the mass storage device, transfer contents to be transferred to the external device,
wherein the bibliography information is transferred to the external device at the time the image data is accumulated in the mass storage device, and the image data is transferred to the external device at a predetermined time.

10. An image processing method comprising:
an accumulating step of accumulating, in a mass storage device which can store a large number of image data, image data which are generated in accordance with the execution of an application relating to image data processing;

a transferring step of transferring, to an external device connected to a network, image data accumulated in the mass storage device;

a bibliography information storing step of storing, in the mass storage device and in correspondence with respective image data, bibliography information relating to the respective image data; and a transfer contents selecting step of selecting, from among the image data and the bibliography information stored in the mass storage device, transfer contents to be transferred to the external device, and a network observing step of observing traffic of the network, wherein the bibliography information is transferred to the external device at the time when the image data is accumulated in the mass storage device, and the image data is transferred to the external device in a case in which an amount of traffic observed by the network observing step is less than a predetermined amount of traffic.

11. An image processing method comprising:

an accumulating step of accumulating, in a mass storage device which can store a large number of image data, image data which are generated in accordance with the execution of an application relating to image data processing;

a transferring step of transferring, to an external device connected to a network, image data accumulated in the mass storage device;

a bibliography information storing step of storing, in the mass storage device and in correspondence with respective image data, bibliography information relating to the respective image data; and a transfer contents selecting step of selecting, from among the image data and the bibliography information stored in the mass storage device, transfer contents to be transferred to the external device, wherein the bibliography information is transferred to the external device at the time when image data is accumulated in the mass storage device, and the image data is transferred to the external device in response to a request from the external device.

12. The image processing method according to claim 11, further comprising an HTTP server step of providing a service to a client in accordance with HTTP protocol, and an XML analyzing step of analyzing description contents which are described in XML language.

13. The image processing method according to claim 12, wherein the request from the external device is a transfer request which is formed from an HTTP request in which XML data is embedded in a body part.

14. The image processing method according to claim 12, further comprising a printing step of printing the image data, wherein the request from the external device is a print request which is formed from an HTTP request in which XML data, which describes in XML language that image data is to be printed by the printing step, is embedded in a body part.

15. The image processing method according to claim 12, further comprising a fax transmitting step of fax transmitting the image data, wherein the request from the external device is a fax transmission request which is formed from an HTTP request in which XML data, which describes in XML language that image data is to be fax transmitted by the fax transmitting step, is embedded in a body part.

16. The image processing method according to claim 12, further comprising an erasing step of erasing image data and bibliography information stored in the mass storage device, wherein the request from the external device is an erase request which is formed from an HTTP request in which XML data, which describes in XML language that image data and bibliography information stored in the mass storage device are to be erased, is embedded in a body part.

17. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including, a memory control module which stores, in the storage section and in correspondence with respective image data, bibliography information relating to the respective image data; and a data transfer module which transfers, to an external device, transfer contents formed from the image data and/or bibliography information stored in the storage section, and wherein the bibliography information is transferred to the external device at the time the image data is accumulated in the storage section, and the image data is transferred to the external device at a predetermined time.

18. The image forming device according to claim 17, wherein the data transfer module includes a network observing unit which observes traffic of the network, and the bibliography information is transferred to the external device at the time when the image data is accumulated in the storage section, and the image data is transferred to the external device in a case in which an amount of traffic observed by the network observing unit is less than a predetermined amount of traffic.

19. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including, a memory control module which stores, in the storage section and in correspondence with respective image data, bibliography information relating to the respective image data; and a data transfer module which transfers, to an external device, transfer contents formed from the image data and/or bibliography information stored in the storage section, and wherein the bibliography information is transferred to the external device at the time when image data is accumulated in the storage section, and the image data is transferred to the external device in response to a request from the external device.

20. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including,
a network control service which controls network communication with an external device; and an HTTP analyzing module which analyzes contents of HTTP command data inputted from the external device via a network, and wherein the HTTP command data is a transfer request formed from an HTTP request in which XML data is embedded in a body part.

21. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including,
a network control service which controls network communication with an external device; and
an HTTP analyzing module which analyzes contents of HTTP command data inputted from the external device via a network, and wherein the HTTP command data is a print request formed from an HTTP request in which XML data, which describes in XML language that image data is to be printed by the printing section, is embedded in a body part.

22. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including,
a network control service which controls network communication with
an external device; and an HTTP analyzing module which analyzes contents of HTTP command data inputted from the external device via a network, and wherein the platform further comprises a fax control service module which controls fax transmission, and the HTTP command data is a fax transmission request formed from an HTTP request in which XML data, which describes in XML language that image data is to be fax transmitted by the fax control service module, is embedded in a body part.

23. An image forming device comprising:

hardware resources used in image forming processing such as a display section, a printing section, a storage section, and an image pick-up section;

a plurality of applications, which carry out image forming processings specific to the respective user services of printing, copying, facsimile; and a platform which is provided between the applications and the hardware resources, wherein when the user services are provided, the platform commonly carries out management of the hardware resources and control of execution which are carried out at the plurality of applications, the platform including,
a network control service which controls network communication with an external device; and an HTTP analyzing module which analyzes contents of HTTP command data inputted from the external device via a network, and wherein when the memory control module receives an erase request formed from an HTTP request in which XML data, which describes in XML language that image data and bibliography information stored in the storage section are to be erased, is embedded in a body part, said image data and bibliography information are erased from the storage section.

* * * * *